(12) United States Patent
Griffin et al.

(10) Patent No.: US 9,253,632 B2
(45) Date of Patent: Feb. 2, 2016

(54) PORTABLE BRIDGE DEVICE

(71) Applicant: RESEARCH IN MOTION LIMITED, Waterloo (CA)

(72) Inventors: Jason Tyler Griffin, Kitchener (CA); Alistair Robert Hamilton, Sammamish, WA (US)

(73) Assignee: BlackBerry Limited, Waterloo, Ontario (CA)

(*) Notice: Subject to any disclaimer, the term of this patent is extended or adjusted under 35 U.S.C. 154(b) by 213 days.

(21) Appl. No.: 13/847,914

(22) Filed: Mar. 20, 2013

(65) Prior Publication Data
US 2014/0287685 A1 Sep. 25, 2014

(51) Int. Cl.
| | |
|---|---|
| H04B 7/15 | (2006.01) |
| H04B 7/14 | (2006.01) |
| H04B 7/00 | (2006.01) |
| H04W 12/02 | (2009.01) |
| H04W 76/02 | (2009.01) |
| H04W 4/00 | (2009.01) |
| H04W 12/00 | (2009.01) |
| H04L 29/06 | (2006.01) |
| H04W 88/04 | (2009.01) |
| H04W 12/06 | (2009.01) |

(52) U.S. Cl.
CPC ........... *H04W 12/02* (2013.01); *H04L 63/0272* (2013.01); *H04L 63/0281* (2013.01); *H04W 4/00* (2013.01); *H04W 12/00* (2013.01); *H04W 76/023* (2013.01); *H04W 12/06* (2013.01); *H04W 88/04* (2013.01)

(58) Field of Classification Search
USPC ............. 455/7, 11.1, 15, 20, 41.1, 41.2, 41.3; 370/315, 338
See application file for complete search history.

(56) References Cited

U.S. PATENT DOCUMENTS

| | | | |
|---|---|---|---|
| 5,960,074 A | 9/1999 | Clark | |
| 7,346,025 B2 | 3/2008 | Bryson | |
| 7,672,695 B1 | 3/2010 | Rainnie et al. | |
| 8,102,836 B2 * | 1/2012 | Jerlhagen et al. | 370/350 |
| 2002/0037741 A1 * | 3/2002 | Tjalldin et al. | 455/552 |
| 2004/0185777 A1 | 9/2004 | Bryson | |

(Continued)

OTHER PUBLICATIONS

Extended European Search Report mailed Jul. 17, 2014; in corresponding European patent application No. 13169121.4.

(Continued)

*Primary Examiner* — Nguyen Vo
(74) *Attorney, Agent, or Firm* — Fish & Richardson P.C.

(57) ABSTRACT

A portable bridge device and methods for transmitting application data from the portable bridge device to one or more local devices of varying types, platforms and operating systems are described. In one embodiment, the method comprises establishing communication channels between the portable bridge device and first and second local devices, determining a platform or operating system of the local devices, and formatting, based on the determined platform or operating system, application data and transmitting the formatted application data to a portable bridge device interface module of the local devices via the communication channels. The portable bridge device may also establish a long-range communication channel to a remote computing device, and may operate as a gateway to a remote source of applications or resources. Operation of locally connected devices with the portable bridge device is not impacted by a temporary loss of connectivity between the portable bridge device and remote sources.

23 Claims, 18 Drawing Sheets

(56) References Cited

U.S. PATENT DOCUMENTS

| | | |
|---|---|---|
| 2006/0133414 A1 | 6/2006 | Luoma |
| 2007/0136592 A1 | 6/2007 | Smith |
| 2007/0167190 A1 | 7/2007 | Moosavi et al. |
| 2008/0261525 A1* | 10/2008 | Matsuo et al. ............... 455/41.2 |
| 2010/0057969 A1* | 3/2010 | Meiri et al. ................... 710/303 |
| 2010/0165960 A1 | 7/2010 | Richardson |
| 2010/0306528 A1 | 12/2010 | Andress et al. |
| 2011/0096726 A1 | 4/2011 | Schlack |
| 2011/0294502 A1 | 12/2011 | Oerton |
| 2012/0257610 A1 | 10/2012 | Maki et al. |
| 2013/0059625 A1* | 3/2013 | Clegg et al. ................ 455/552.1 |
| 2014/0094124 A1* | 4/2014 | Dave et al. ................... 455/41.2 |
| 2014/0342709 A1* | 11/2014 | Stepanian .................. 455/414.1 |

OTHER PUBLICATIONS

Hernandez J F et al., "Body area network for wireless patient monitoring", IET Communications, vol. 2, No. 2, Feb. 1, 2008, pp. 215-222.

* cited by examiner

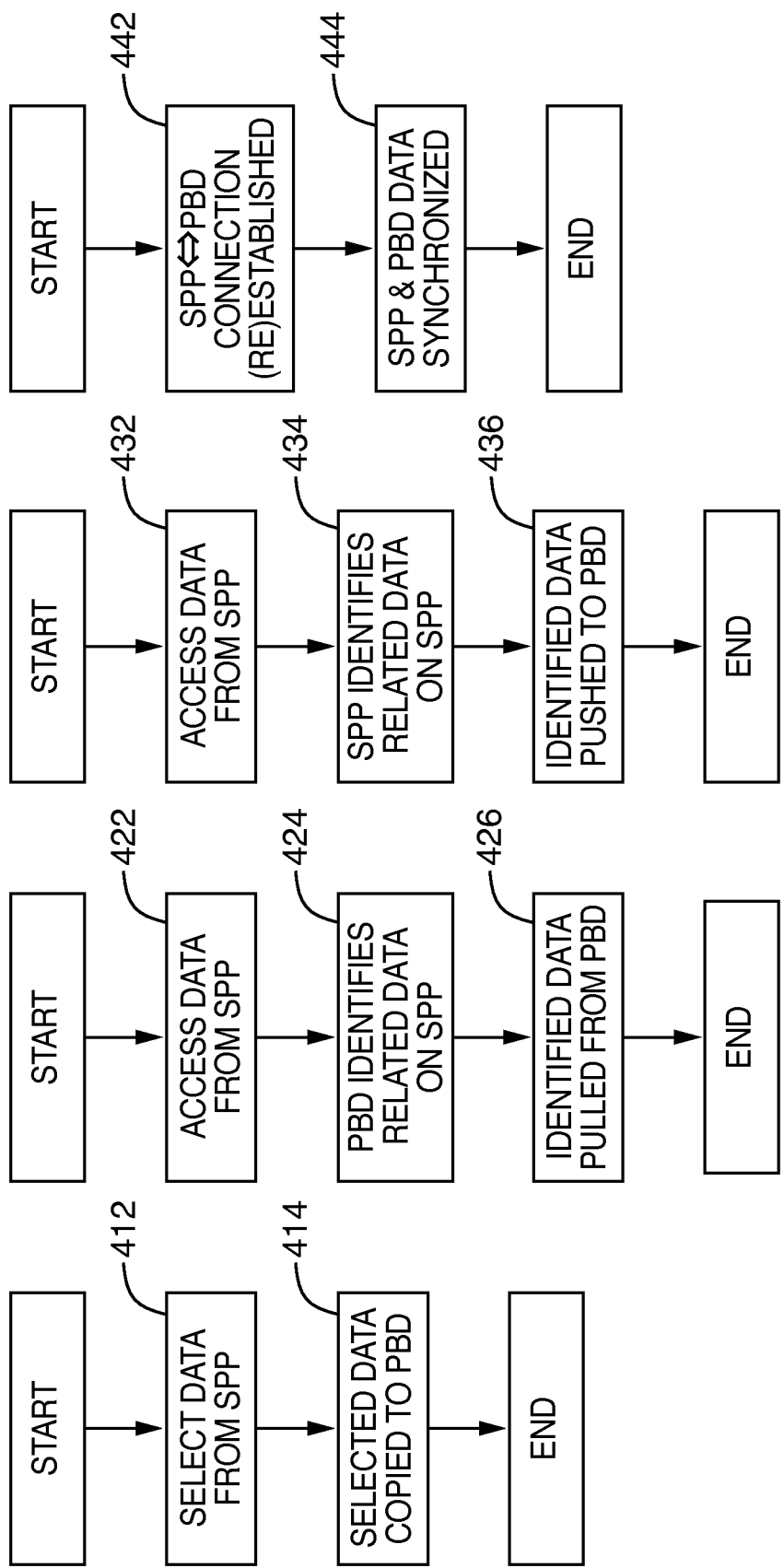

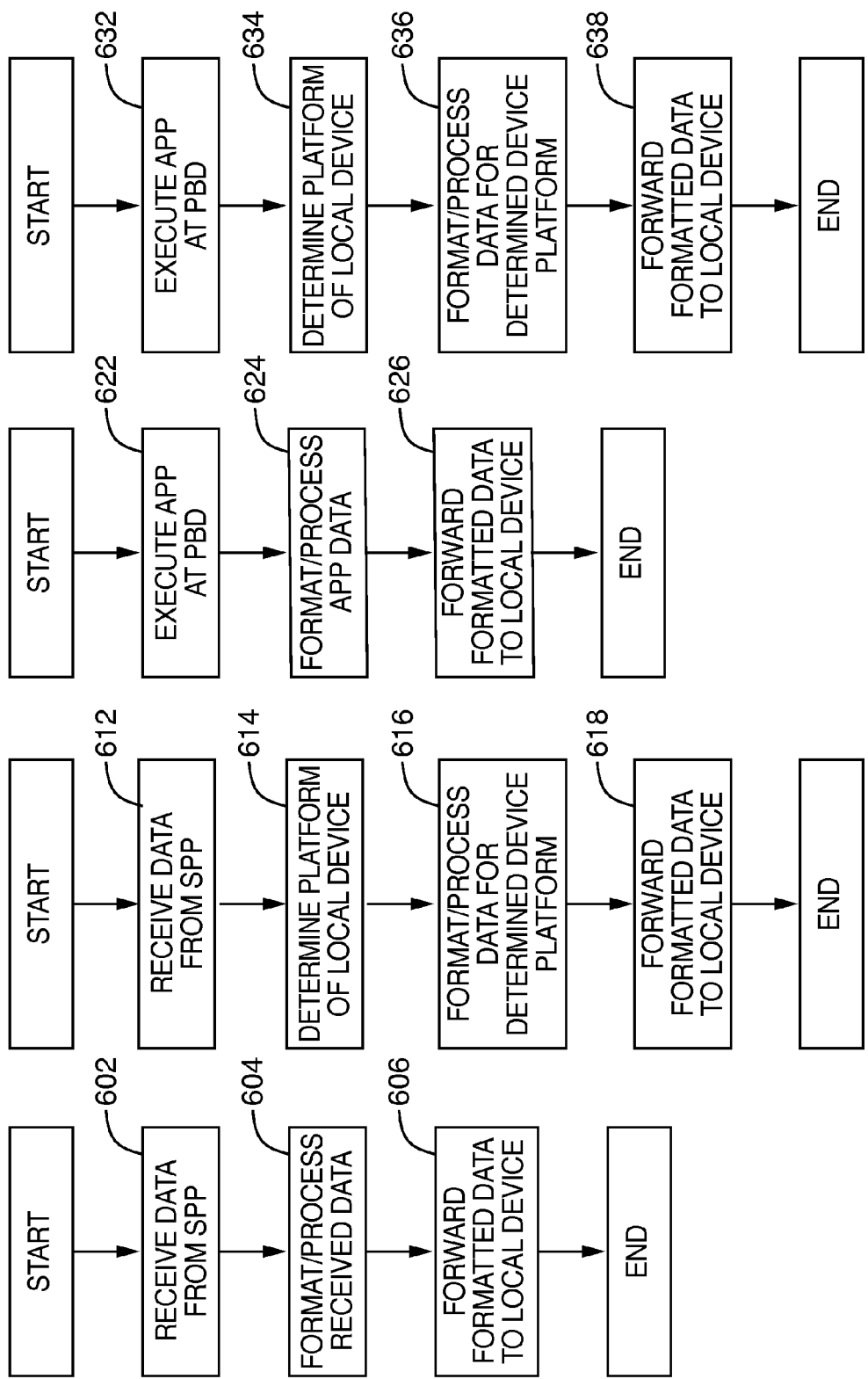

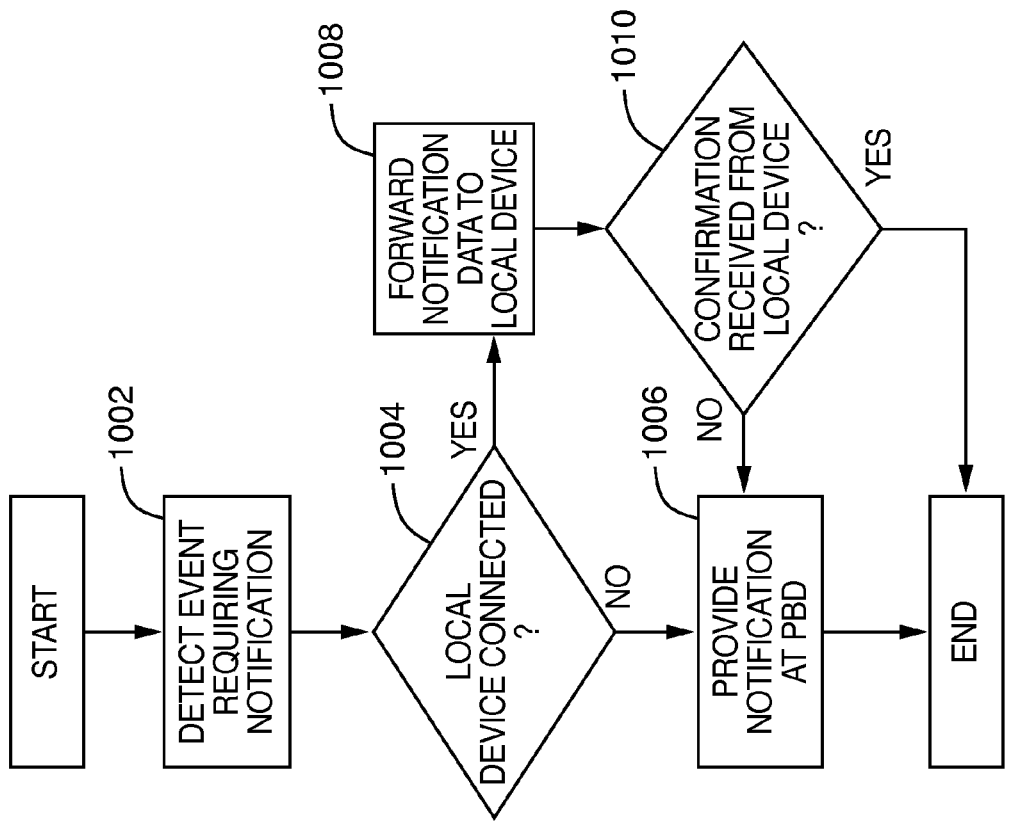
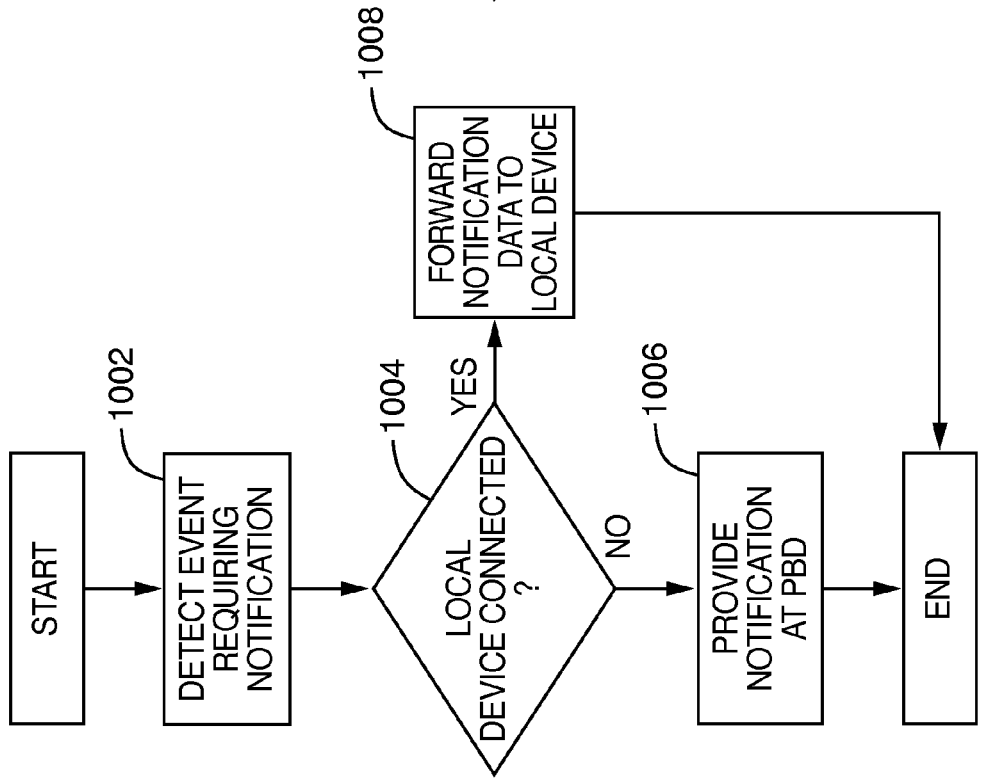

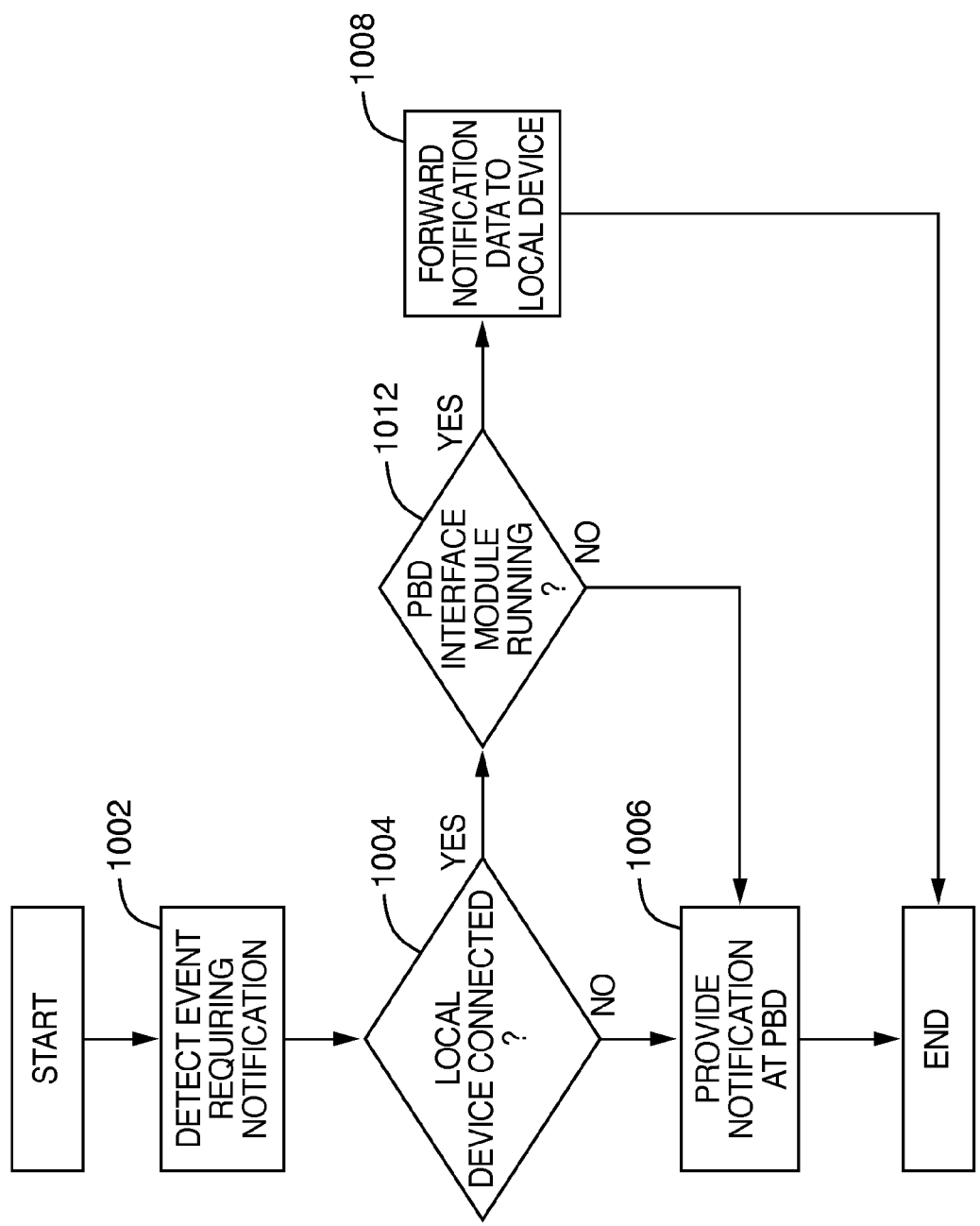

PORTABLE BRIDGE DEVICE

FIELD

Embodiments disclosed herein relate generally to device management (e.g. mobile devices), and more particularly to a device configured to assist in the establishment of a local network connecting a plurality of other devices.

BACKGROUND

In order to provide access to up-to-date data (e.g. e-mail, databases, files such as word processing documents and presentations, etc.) across a number of devices, some known systems provide access to services and applications used by mobile devices and local computers using a "cloud". Cloud computing typically refers to the consumption of computing resources that are made available over a network such as the Internet. Cloud-based applications may be accessed by client devices through a web browser or a local module, for example, with the applications being hosted and application data being stored primarily on remote servers. For example, common applications (e.g., e-mail, calendar, tasks, and contacts) may be serviced from a cloud, and data used by the application may be periodically synchronized between local devices and the cloud.

To control access to sensitive data, for example corporate data, one approach is to provide users with "secure" endpoint devices from which they can access the sensitive data. For example, a user may be provided with a laptop or other mobile communication device that provides a sufficient level of security features (e.g. device access control, encrypted communications and/or file storage, remote wipe capabilities) so that a corporate IT department may be reasonably assured that data transferred to or from, or stored on such a device is secure.

BRIEF DESCRIPTION OF THE DRAWINGS

For a better understanding of the described embodiments and to show more clearly how they may be carried into effect, reference will now be made, by way of example, to the accompanying drawings in which:

FIGS. 4a-4d are flow charts of methods of retrieving and/or synchronizing data from a storage and provisioning portal in accordance with some example embodiments;

FIGS. 6a-6d are flow charts of methods of processing data received from a storage and provisioning portal and/or generated at a portable bridge device and forwarding this processed data to a locally connected device in accordance with some example embodiments;

FIGS. 10a-10c are flow charts of methods of forwarding event notifications to one or more locally connected devices via a portable bridge device in accordance with some example embodiments;

DESCRIPTION OF EXAMPLE EMBODIMENTS

Figure 1:
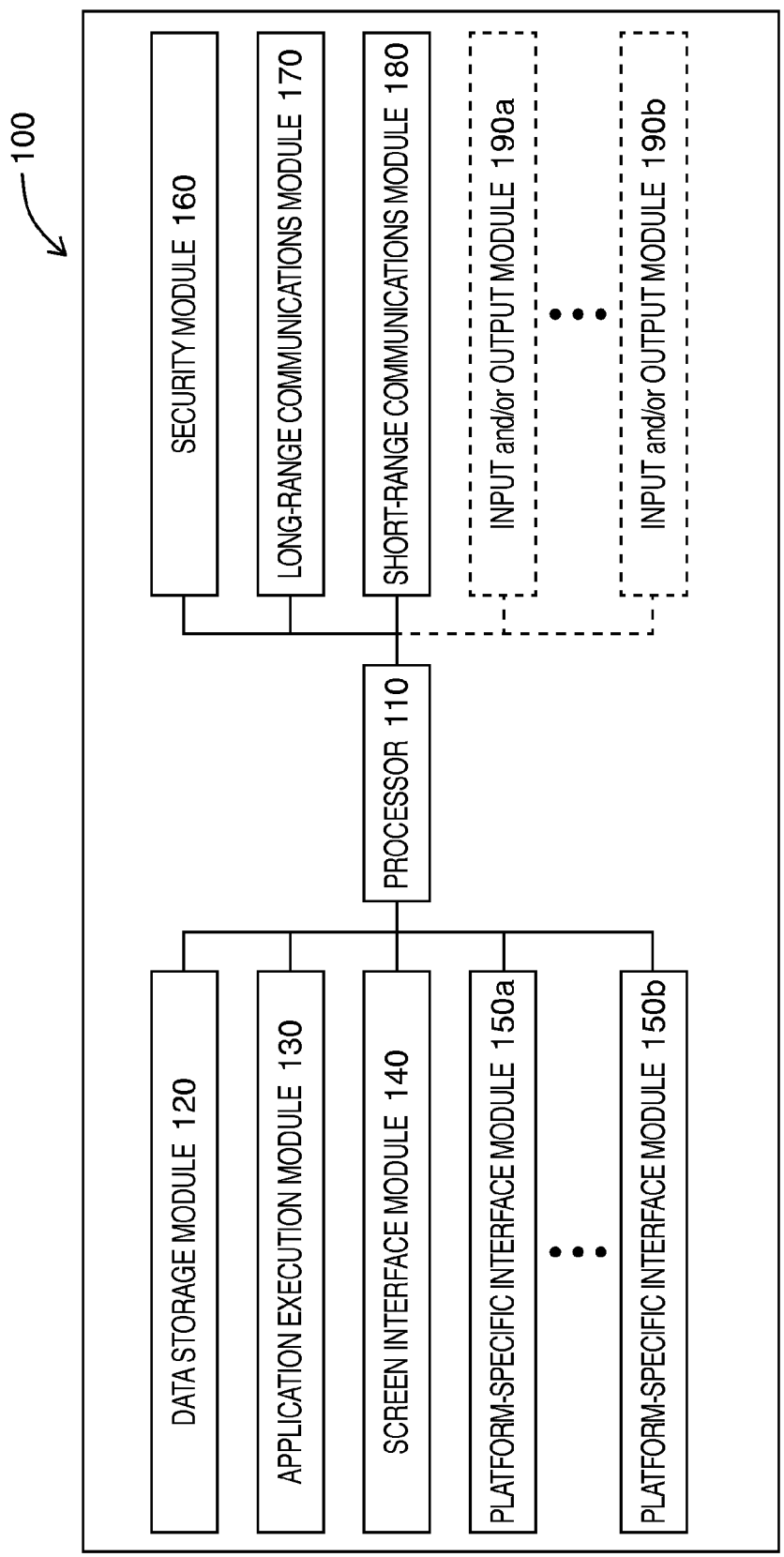
FIG. 1 is a block diagram of a portable bridge device in accordance with at least one example embodiment.

As computing devices become more prevalent, it is increasingly common for a user to own (or be provided with) more than one computing device for personal and/or business use. For example, a user may operate a laptop computer, a tablet computing device, and/or a mobile communication device, to name a few.

If a user interacts with (or generates) the same types of data using multiple computing devices, a situation may arise where different data, or different versions of the same data, is stored locally on each device. For example, in the case of address book data, a user may enter a phone number associated with a contact in an address book stored at the user's mobile communication device, but the address book data stored at the user's laptop will not be updated until the address book data records between the two devices are synchronized.

However, typical cloud-based systems may face challenges associated with security and/or connectivity issues. Known cloud-based systems may not adequately support the needs of users who use multiple devices associated with varying device platforms, potentially in both personal and corporate environments, and particularly where lack of connectivity or platform incompatibility issues may arise.

Furthermore, it is increasingly common for a user to desire to use their personal computing device (i.e. a computing device that the user owns and is responsible for maintaining) in order to access corporate or other sensitive data (e.g. business data). For example, a user may desire to access work data from their residence using their personal computer, and/or access their corporate e-mail account using their personal tablet computing device or their personal mobile communication device.

To control access to sensitive data, for example corporate data, one approach is to provide users with secure endpoint devices from which they can access the sensitive data. For example, a user may be provided with a laptop or other mobile communication device that provides a sufficient level of security features (e.g. device access control, encrypted communications and/or file storage, remote wipe capabilities) so that a corporate IT department (e.g. a system administrator) may be reasonably assured that data transferred to or from, or stored on such a device is secure.

Since the endpoint device is considered secure by the administrator, it may be permissible for sensitive data to be cached or otherwise stored on the endpoint device. For example, a user may be able to download and store a copy of a file locally on the endpoint device, in order to allow the user to access the data when a network connection to a corporate server is not available. Data between the endpoint device and the corporate server may then be synchronized when connectivity is re-established.

However, users are increasingly requesting the ability to access corporate data from a number of different endpoint devices (e.g. a laptop, tablet computer, and/or mobile phone). A corporate IT department may not want—or be able—to provide users with a plurality of secured endpoints (e.g. for budgetary reasons). Also, users are increasingly requesting the ability to access corporate data using devices that may not even be considered capable of providing a sufficient level of security (for example, devices executing inherently less secure operating systems, devices that do not have the ability to securely encrypt communications and/or provide secure file storage, etc.).

Another approach to controlling access to sensitive data is to configure a user's device to act as an ultra-thin client (e.g. a "zero client") for an application executed on and/or served by a cloud or other remote server. With the client device maintaining a secure network connection with the remote server, the client merely renders output from the remote server, with applications being executed on the remote server, and application data being stored on the remote server. In general, no sensitive data is to be stored on the client device. However, these systems are susceptible to problems when there is a loss of connectivity. If connectivity is lost, the applications are typically unavailable to client devices and malfunctions may occur. Also, from the perspective of the client device, the use of ultra-thin clients may be more bandwidth-intensive than approaches that allow for a greater amount of data to be stored locally on the client device.

Another concern relating to managing a plurality of endpoint devices using typical cloud-based data systems is device or platform incompatibility. For example, challenges may be faced when a corporate IT department attempts to provide and manage (e.g. by patching, testing, or otherwise accommodating) a multitude of different secure endpoint devices, especially when the devices are of different types, or operate on different operating systems.

To address at least some of the aforementioned issues, a portable bridge device ("PBD") or appliance is described herein, which in some embodiments may be configured for use in the formation of a local network consisting of a plurality of devices, which may be of varying types. These devices may operate on different platforms, and run on different operating systems. Furthermore, in some embodiments the portable bridge device may provide a gateway, for each of the devices in the local network, to corporate or other cloud resources stored remotely at a storage and provisioning portal ("SPP") or other remote source, for example.

In some embodiments, the portable bridge device synchronizes with the SPP or other remote source, and is updated when the portable bridge device establishes connectivity with the SPP or other remote source. Advantageously with this arrangement, local operation need not be impacted by a loss of connectivity between the portable bridge device and the remote source.

The portable bridge device may support a group of devices operating on differing platforms by acting as a local hub. Different types of devices can be supported, including both personal and corporate devices. Specialized hardware devices and work tools, and associated software, may also be accommodated. The portable bridge device may provide access to applications and various interfaces to each of the supported group of devices.

In one broad aspect, there is provided a portable bridge device comprising: a processor and a memory; a short-range communication module configured to establish a first communication channel between the portable bridge device and a first local device, and configured to establish a second communication channel between the portable bridge device and a second local device; and at least one platform-specific interface module configured to: determine a first platform or operating system of the first local device; format, based on the determined first platform or operating system, first application data to be transmitted to a first portable bridge device interface module of the first local device via the first communication channel; determine a second platform or operating system of the second local device; and format, based on the determined second platform or operating system, second application data to be transmitted to a second portable bridge device interface module of the second local device via the second communication channel.

In some embodiments, the portable bridge device is configured to transmit the first application data and the second application data to the first portable bridge device interface module and the second portable bridge device interface module, respectively.

In some embodiments, the first platform or operating system of the first local device and the second platform or operating system of the second local device are different.

In some embodiments, the at least one platform-specific interface module is configured to format the first application data such that the appearance and/or behavior of functional and stylistic graphical elements presented by the first portable bridge device interface module at a display of the first local device is stylistically consistent with the first platform or operating system of the first local device.

In some embodiments, the at least one platform-specific interface module is configured to format the second application data such that the appearance and/or behavior of functional and stylistic graphical elements presented by the second portable bridge device interface module at a display of the second local device is stylistically consistent with the second platform or operating system of the second local device.

In some embodiments, the portable bridge device is sized such that it may be easily carried on the body of a user.

In some embodiments, the portable bridge device is configured to be at least one of: attached to a belt, stored in a pocket, and carried in a briefcase or purse.

In some embodiments, the portable bridge device further comprises an application execution module configured to execute at least one application at the portable bridge device to generate the first and second application data.

In some embodiments, the at least one platform-specific interface module is further configured to: receive, from the first portable bridge device interface module via the first communication channel, first input data associated with user input received at the first local device for processing by the application execution module; and receive, from the second portable bridge device interface module via the second communication channel, second input data associated with user input received at the second local device for processing by the application execution module.

In some embodiments, the portable bridge device further comprises a long-range communication module configured to establish a long-range communication channel between the portable bridge device and a remote computing device.

In some embodiments, the remote computing device comprises a storage and provisioning portal.

In some embodiments, the remote computing device is configured to execute at least one application at the remote computing device to generate the first and second application data, and wherein the portable bridge device is configured to receive the first and second application data via the long-range communication channel prior to transmission to, respectively, the first and second portable bridge device interface modules of the first and second local devices.

In some embodiments, the first platform-specific interface module is further configured to: receive, from the first portable bridge device interface module via the first communication channel, first input data associated with user input received at the first local device, and transmit the first input data to the remote computing device via the long-range communication channel; and the second platform-specific interface module is further configured to: receive, from the second portable bridge device interface module via the second communication channel, second input data associated with user input received at the second local device, and transmit the second input data to the remote computing device via the remote communications channel.

In another broad aspect, there is provided a method for transmitting application data from a portable bridge device to a first local device and a second local device, the method comprising: establishing a first communication channel between the portable bridge device and the first local device; establishing a second communication channel between the portable bridge device and the second local device; determining a first platform or operating system of the first local device; the portable bridge device formatting, based on the determined first platform or operating system, first application data and transmitting the formatted first application data to a first portable bridge device interface module of the first local device via the first communication channel; determining a second platform or operating system of the second local device; and the portable bridge device formatting, based on the determined second platform or operating system, second application data and transmitting the formatted second application data to a second portable bridge device interface module of the second local device via the second communication channel.

In some embodiments, the method further comprises transmitting the first application data and the second application data to the first portable bridge device interface module and the second portable bridge device interface module, respectively.

In some embodiments, the first platform or operating system of the first local device and the second platform or operating system of the second local device are different.

In some embodiments, the formatting first application data comprises processing the first application data such that the appearance and/or behavior of functional and stylistic graphical elements presented by the first portable bridge device interface module at a display of the first local device is stylistically consistent with the first platform or operating system of the first local device.

In some embodiments, the formatting second application data comprises processing the second application data such that the appearance and/or behavior of functional and stylistic graphical elements presented by the second portable bridge device interface module at a display of the second local device is stylistically consistent with the second platform or operating system of the second local device.

In some embodiments, the method further comprises executing, using an application execution module, at least one application at the portable bridge device to generate the first and second application data.

In some embodiments, the method further comprises receiving, from the first portable bridge device interface module via the first communication channel, first input data associated with user input received at the first local device for processing by the application execution module.

In some embodiments, the method further comprises receiving, from the second portable bridge device interface module via the second communication channel, second input data associated with user input received at the second local device for processing by the application execution module.

In some embodiments, the method further comprises establishing a long-range communication channel between the portable bridge device and a remote computing device, wherein the remote computing device is configured to execute at least one application at the remote computing device to generate the first and second application data; and receiving the first and second application data via the long-range communication channel prior to transmission to, respectively, the first and second portable bridge device interface modules of the first and second local devices.

In some embodiments, the method further comprises receiving, from the first portable bridge device interface module via the first communication channel, first input data associated with user input received at the first local device, and transmitting the first input data to the remote computing device via the long-range communication channel.

In some embodiments, the method further comprises receiving, from the second portable bridge device interface module via the second communication channel, second input data associated with user input received at the second local device, and transmitting the second input data to the remote computing device via the remote communications channel.

In another broad aspect, there is provided a computer-readable medium comprising computer-readable instructions that, when executed by a processor of a portable bridge device, cause the portable bridge device to transmit formatted application data from the portable bridge device to a first local device and a second local device, the instructions configuring the processor to: establish a first communication channel between the portable bridge device and the first local device; establish a second communication channel between the portable bridge device and the second local device; determine a first platform or operating system of the first local device; format, based on the determined first platform or operating system, first application data for transmission to a first portable bridge device interface module of the first local device via the first communication channel; determine a second platform or operating system of the second local device; and format, based on the determined second platform or operating system, second application data for transmission to a second portable bridge device interface module of the second local device via the second communication channel.

These and other aspects and features of various embodiments will be described in greater detail below. Embodiments of the present application are not limited to any particular computing device architecture; it is to be understood that alternate embodiments are feasible.

Reference is now made to FIG. 1, which illustrates an example embodiment of a portable bridge device 100.

In some embodiments, portable bridge device 100 may be designed to be relatively small and light-weight, so as to be easily carried on the body of a user (e.g., attached to a belt, stored in a pocket, or carried in a briefcase/purse).

Portable bridge device 100 comprises a processor 110 operatively coupled to a data storage module 120, an application execution module 130, a screen interface module 140, one or more platform-specific interface modules 150a-b, a security module 160, a long-range communication module 170, a short-range communication module 180, and one or more input and/or output modules 190a-b. The functionality of each of these modules will be discussed further below.

Input and/or output modules 190a-b are configured to drive one or more input, output, or input/output devices such as: a display, an indicator light (e.g. a light emitting diode ("LED")); an audio device (e.g. a microphone or a speaker); a vibration actuator; a keypad comprising one or more keys or buttons; a trackpad; a roller ball; a touchscreen; an orientation sensor such as an accelerometer capable of determining if a user is reorienting the portable bridge device (such as when a user tilts, pans, rotates, or otherwise reorients the portable bridge device), etc.

However, in some embodiments, the portable bridge device may have few or no user interface components. For example, the portable bridge device may have no user interface components other than a status indicator and/or a power on/off/reset switch. In some embodiments, the portable bridge device may have a minimal, output-only user interface. For example, the portable bridge device may have a device status indicator, a WAN (Wide Area Network) connectivity indicator, a LAN (Local Area Network) connectivity indicator, and/or a "message waiting" indicator. These indicators may provide visual output (e.g. from LEDs), audio tones, and/or vibration pulses, for example.

In embodiments where a portable bridge device is provided without a physical display (e.g. an LCD (Liquid Crystal Display) or OLED (Organic Light-Emitting Diode) display), screen interface module 140 may be configured to allow a user to configure and/or control features of the portable bridge device via a display interface of a computing device communicatively coupled to the portable bridge device (e.g. a user interface screen displayed on a computing device connected to the portable bridge device over a network). For example, screen interface module 140 may be configured to receive input entered at a remote computing device, and to generate output for display on a remote display. In some embodiments, this may be similar to the use of a user interface of a computing device communicatively coupled to a network router to configure the router, rather than to use a user interface physically present on the network router for configuration.

Device Connectivity

Figure 2A:
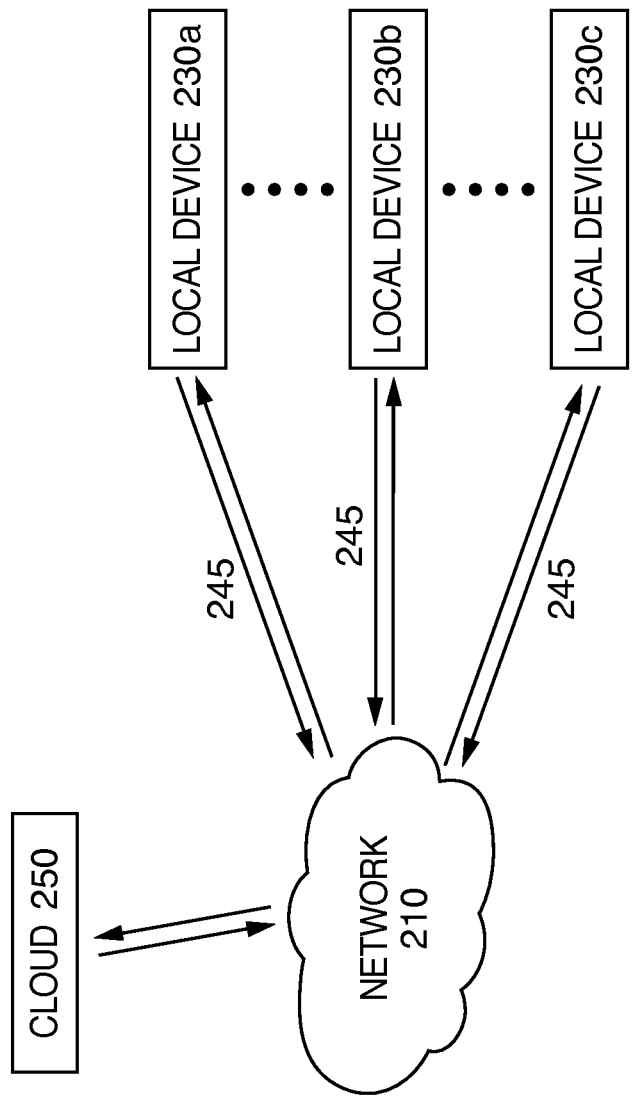
FIG. 2a is a diagram of an example "cloud" system including a plurality of local devices.

Regarding communications, in a typical cloud solution, each device generally requires a separate connection to the cloud. For example, as shown in FIG. 2a, to synchronize and/or share data between a first locally connected device 230a (e.g. a laptop computer), a second locally connected device 230b (e.g. a tablet computing device), and a third locally connected device 230c (e.g. a mobile communication device such as a smartphone) using a cloud system would require each of the locally connected devices 230a-c to transfer data over their own separate long-range network connection 245 to a network 210 (e.g. the Internet) to cloud 250.

Figure 2B:
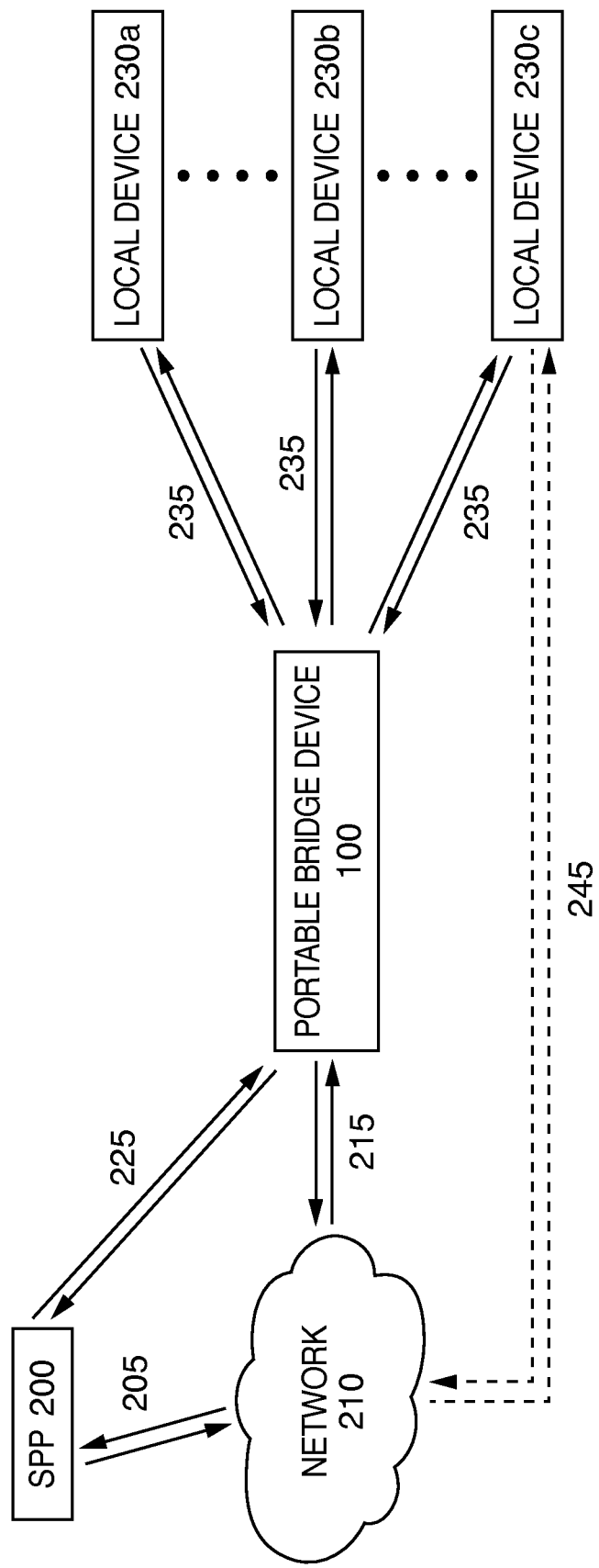
FIG. 2b is a diagram of a system comprising a portable bridge device, a storage and provisioning portal, and a plurality of local devices in accordance with at least one example embodiment.

In at least one embodiment, short-range communication module 180 is configured to allow portable bridge device 100 to be used as a local connection hub for a plurality of locally connected devices 230a-c. FIG. 2b illustrates an example network topology incorporating portable bridge device 100. Short-range communication module 180 may establish a short-range connection 235 between portable bridge device 100 and one or more locally connected devices 230a-c using any suitable wired or wireless protocol. For example, short-range communication module 180 may configure portable bridge device 100 to provide a WLAN (Wireless Local Access Network), WPAN (Wireless Personal Access Network), a point-to-point network, or any other suitable network topology using a standard communications protocol (e.g. one or more of the 802.11 family of standards). In some embodiments, any or all of the one or more local devices may be connected to each other via portable bridge device 100.

In some embodiments, a short-range wireless communications protocol such as Bluetooth® or Wireless USB may be used to provide short-range connections 235. By using a short-range communications protocol, communication between portable bridge device 100 and a locally connected device 230a-c may only be established when the portable bridge device and local device are in sufficiently close physical proximity (e.g. within approximately 10 m, or within approximately 3 m) in accordance with some embodiments. In some embodiments, other suitable mechanisms for determining the proximity of the portable bridge device 100 to a locally connected device 230a-c may be used (for example, a location of the portable bridge device may be determined (e.g. using a Global Positioning System (GPS) or an assisted Global Positioning System (aGPS)) and compared to a similarly determined location of the locally connected device 230a-c in order to determine the relative proximity of the devices).

In some embodiments, portable bridge device 100 may store a secret, shared with a locally connected device 230a-c (e.g. an encryption key), that may be used to facilitate encrypted communications with the locally connected device 230a-c over the short-range connection 235.

In some embodiments, portable bridge device 100 may be configured to provide a shared secret to a locally connected device 230a-c during an initial setup. In some embodiments, the shared secret may be sent to each of a plurality of locally connected devices 230a-c by a third entity (e.g. in accordance with an IT policy or a security policy). In other embodiments, the shared secret may be communicated from portable bridge device 100 to a locally connected device 230a-c or vice-versa.

Long-range communication module 170 is configured to connect portable bridge device 100 to a network 210 (e.g. the Internet) and/or one or more dedicated servers (e.g. Storage and Provisioning Portal (SPP) server) 200 via a long-range WAN connection. In some embodiments, the WAN is established using a standard communications protocol (e.g. General Packet Radio Service (GPRS), Worldwide Interoperability for Microwave Access (WiMAX), Long Term Evolution (LTE), LTE Advanced).

In some embodiments, the portable bridge device may also be provided with a wired network connection (e.g. USB or Ethernet port) for connecting to the network 210 and/or SPP 200.

In some embodiments, portable bridge device 100 may provide network access (e.g. Internet access) to a locally connected device 230a-c via short-range connection 235 and long-range network connection 215. That is, portable bridge device 100 may function similar to a local network access point or "hotspot" for one or more locally connected devices 230a-c, in variant embodiments.

Short-range communication module 180 may be configured to allow portable bridge device 100 to be used as a local connection hub for one or more local devices 230a-c independent of the connectivity provided by long-range communication module 170. Accordingly, even when long-range connectivity to the Internet and/or SPP (e.g. via connections 215 and/or 225) does not exist, the local connection hub supported by the portable bridge device (i.e. short range connection 235) still functions.

In some embodiments, portable bridge device 100 may provide one or more local devices with access to a remote server (e.g. SPP 200) via short-range connection 235 and long-range network connection 225. In some embodiments, portable bridge device 100 may provide access via short-range connection 235 and long-range network connections 215 and 205. In some embodiments, portable bridge device 100 may provide access via short-range connection 235 and one or more of long-range network connections 225, 215, and 205.

Figure 2C:
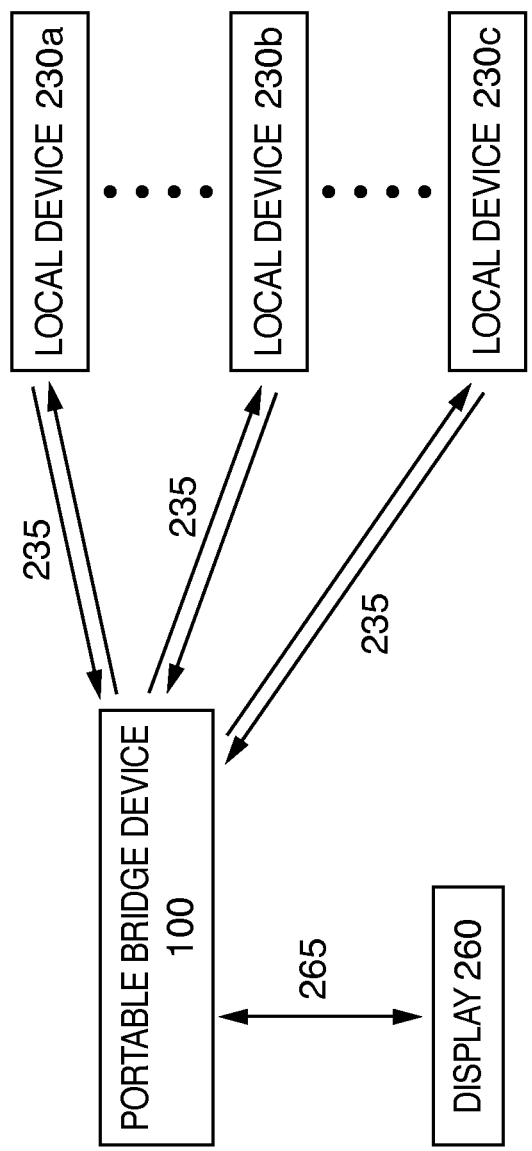
FIG. 2c is a diagram of a system comprising a portable bridge device connected to an external display and a plurality of local devices in accordance with one example embodiment.

In some embodiments, portable bridge device 100 may be provided with an audio/video interface (such as an High-Definition Multimedia Interface (HDMI), Micro-HDMI, or Mobile High-Definition Link (MHL) port), and an input and/or output module 190 and/or screen interface module 140 may be configured to drive an external display. For example, as shown in FIG. 2c, portable bridge device 100 may be connected to an external display 260 using an interface cable 265 to display a presentation data file stored on portable bridge device 100. In some embodiments, this presentation may be controlled using a locally connected device 230a-c, connected to portable bridge device 100 over short-range connection 235. By serving the presentation to the external display 260 directly from portable bridge device 100, since the data is local to the bridge device, a locally connected device 230a-c may only need to send control commands (e.g. go to next slide (in a slide presentation), play/pause (in a video presentation), etc.) over short-range connection 235. Accordingly, data transfer over short-range connection 235 may be reduced in comparison to sending a presentation data file from locally connected device 230a-c.

Remote Storage and Provisioning (SPP) Server

As will be discussed further below, the storage and provisioning portal (SPP) 200 may provide a variety of services and resources, perform application provisioning and maintenance, and enforce policies, if appropriate, for a particular locally connected device (e.g., if a company configures a company device in accordance with IT policies).

SPP 200 may be hosted at a site of a customer, of a telecommunications carrier, a remote network, or at any designated location. In some embodiments, a plurality of portable bridge devices 100 can be communicatively coupled with the SPP contemporaneously.

Network Security

As noted above with regard to FIG. 2a, in a typical cloud solution, each locally connected device 230a-c may transfer data over an associated long-range network connection 245 from a locally connected device 230a-c directly to and from the cloud 250. In this example, each locally connected device 230a-c represents an endpoint device, and therefore if sensitive data is to be accessed at any one of these devices, each device should be considered capable of providing a sufficient level of security (e.g. running a secure operating system, the ability to securely encrypt data, provide secure file storage, etc.). Also, each long-range network connection 245 (to and from each locally connected device 230a-c) should be encrypted and/or otherwise secured.

In contrast, use of a local connection hub as provided by portable bridge device 100 (e.g. the network topography shown in FIG. 2b) may provide a higher level of data security for locally connected devices 230a-c.

In one respect, a short-range connection 235 between portable bridge device 100 and a locally connected device 230a-c may be considered inherently more secure than a long-range network connection 245 due to its shorter range—a potential eavesdropper typically must be sufficiently physically proximate the portable bridge device 100 and/or a locally connected device 230a-c in order to intercept data transferred over short-range connection 235.

In another respect, the ability to position portable bridge device 100 and a locally connected device 230a-c in close physical proximity may facilitate securing a short-range connection 235 between portable bridge device 100 and a locally connected device 230a-c. For example, portable bridge device 100 may be configured to exchange one or more encryption keys with a locally connected device 230a-c in a manner that would not generally be possible in a typical cloud system, as a locally connected device 230a-c would usually not be in close physical proximity to the cloud server(s).

It will be understood by persons skilled in the art that the act of exchanging an encryption key between portable bridge device 100 and a locally connected device 230a-c need not involve the transmission of the actual encryption key itself from one device to the other. It will also be understood that it is not necessary that an actual encryption key be initially generated at only one device and then subsequently transferred to the other device in order to constitute an "exchange". It is sufficient that the encryption key to be used is derived at or otherwise becomes known to each device, through the processing of some data that is shared between the two devices. In that case, a key "exchange" is deemed to have occurred. For example, the shared secret may be derived at each of portable bridge device 100 and a locally connected device 230a-c, using SPEKE (Simple Password Exponential Key Exchange) or a similar protocol.

In some embodiments, portable bridge device 100 may be configured to exchange one or more encryption keys with a locally connected device 230a-c via a wired connection (e.g. over a USB cable).

In some embodiments, portable bridge device 100 may be configured to exchange one or more encryption keys with a locally connected device 230a-c via a visual input/output device, with or without the assistance of a user. For example, in embodiments where portable bridge device 100 is provided with a display, portable bridge device 100 may be configured to display a barcode, to be scanned by a camera or other similar input device, on a locally connected device 230a-c. As another example, portable bridge device 100 may be configured to output a pattern of LED light pulses that a user may count and input to a locally connected device 230a-c via a keypad or other input device.

In some embodiments, portable bridge device 100 may be configured to exchange one or more encryption keys with a locally connected device 230a-c via an audio input/output device, with or without the assistance of a user. For example, portable bridge device 100 may be configured to output a series of tones to be captured by a microphone or other audio input device on a locally connected device 230a-c. As another example, portable bridge device 100 may be configured to output a pattern of beeps and/or musical tones that a user may count (or otherwise interpret) and input to a locally connected device 230a-c via a keypad or other input device.

In some embodiments, portable bridge device 100 may be configured to exchange one or more encryption keys with a locally connected device 230a-c via a short-range connection using a very short range communication protocol, such as Near Field Communications ("NFC") or Radio-Frequency Identification ("RFID"), for example.

In some embodiments, portable bridge device 100 may be configured to determine the proximity of portable bridge device 100 to a locally connected device 230a-c (for example, by determining a location of portable bridge device 100 (e.g. using GPS or aGPS) and compared to a similarly determined location of locally connected device 230, in order to determine the relative proximity of the devices), and to exchange one or more encryption keys with a locally connected device 230a-c only if the locally connected device 230a-c is in close physical proximity to portable bridge device 100.

In another respect, portable bridge device 100 may be considered to provide a higher level of data security because use of portable bridge device 100 in conjunction with one or more locally connected devices 230a-c requires access (and authentication) to both portable bridge device 100 and the one or more locally connected devices 230a-c. Accordingly, in some embodiments, a nefarious user would have to obtain access and successfully authenticate to two separate hardware components. For example, if a user's portable bridge device 100 is lost or stolen, it may not be possible to access portable bridge device 100 and/or SPP 200 without access to a locally connected device 230a-c that has been authenticated to portable bridge device 100. Similarly, if a user's locally connected device 230a-c is lost or stolen, it may not be possible to access SPP 200, and none of the data stored on portable bridge device 100 would be lost or compromised.

In some embodiments, in addition to connecting to portable bridge device 100 over short-range connection 235, one or more locally connected devices 230a-c are able to connect directly to a remote network 210 (e.g. the Internet) via long-range network connection 245. In some embodiments, access to SPP 200 by one or more locally connected devices 230a-c may be controlled by portable bridge device 100. The level of control (e.g. access restrictions) provided by portable bridge device 100 may be determined by the user, or imposed by an administrator (e.g. through an IT policy).

For example, in some embodiments, data that is to be afforded a high level of security and is accessed and/or generated via a locally connected device 230a-c may be stored on portable bridge device 100, and/or synchronized (or otherwise transmitted) to SPP 200 over secured long-range network connections 215 and 205, while data that is to be afforded a lower level of security and is accessed and/or generated via a locally connected device 230a-c may be stored on the locally connected device 230a-c, and/or synchronized (or otherwise transmitted) to SPP 200 over long-range network connection 245, which may be less secure. Rules and/or policies governing: the level of security to be afforded to certain types of data; local data storage permissions; data transmission permissions; and/or data synchronization requirements could be configured and enforced through an IT policy, for example.

In some embodiments, portable bridge device 100 may provide network security features to one or more locally connected devices 230a-c. For example, portable bridge device 100 may act as a firewall or network access control for a locally connected device 230a-c when the locally connected device 230a-c is browsing network 210 (e.g. the Internet). As another example, portable bridge device 100 may be configured to provide access to a company intranet (not shown), or to one or more select (e.g. as configured by an administrator) locally connected devices 230a-c.

Device Data Storage/Caching

Figure 3:
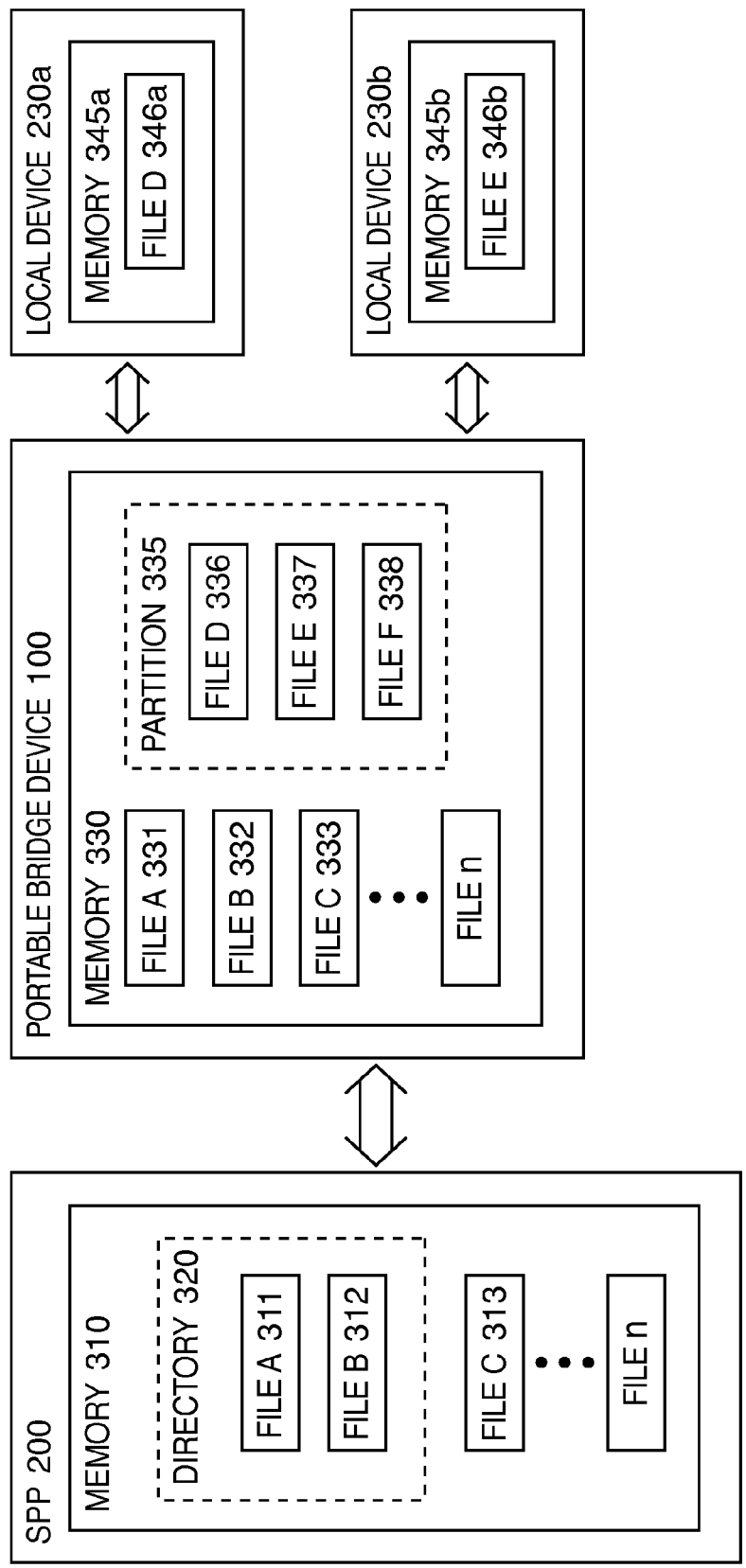
FIG. 3 is a block diagram of a portable bridge device, a storage and provisioning portal, and a plurality of local devices in accordance with at least one example embodiment.

Turning to FIG. 3, in some embodiments, portable bridge device 100 provides a local memory 330 for data storage, which may be controlled by data storage module 120. Local memory 330 may include a shared memory partition 335 that can be accessed by one or more locally connected devices 230a, 230b in order to facilitate data sharing between memories 345a, 345b of, respectively, one or more locally connected devices 230a, 230b via the portable bridge device 100.

For example, data file 346a (e.g. a word processing document) may be generated on locally connected device 230a (e.g. a laptop computer) and saved to the shared memory partition 335 on portable bridge device 100, so that the data file may subsequently be accessed by locally connected device 230b (e.g. a tablet computer) without requiring that the locally connected devices 230a, 230b communicate directly with each other, and without requiring that the locally connected devices 230a, 230b access an external network (e.g. the Internet) or one or more cloud servers (e.g. SPP 200).

As shown in FIG. 3, in some embodiments a copy 336 of data file 346a may be stored in shared memory partition 335 such that the copy 336 can be accessed by local device 230b even if local device 230a is not currently connected to the portable bridge device 100. In a similar manner, a copy 337 of data file 346b may be stored in shared memory partition 335 such that the copy 337 can be accessed by local device 230a. In some embodiments, copy 336 of data file 346a may only be temporarily cached at portable bridge device 100. For example, copy 336 of data file 346a may be erased from shared memory partition 335 in response to the termination of the connection between local device 230a and portable bridge device 100, such that copy 336 can only be accessed by local device 230b while local device 230a is currently connected to the portable bridge device.

In some embodiments, portable bridge device 100 may function as a local file server. For example, one or more files 337, 338 may be stored on the portable bridge device 100 so that a user can access these files using either locally connected device 230a, 230b.

In some embodiments, at least one of files 337, 338 may be a media data file (e.g. an audio file, an image file, a video file) stored on portable bridge device 100. Accordingly, portable bridge device 100 may function as a local media server, so that a user can access a library of media files stored on the portable bridge device from any locally connected device.

Portable bridge device 100 may also store local copies of certain data files from SPP 200, such as files 331, 332, and 333 in local memory 330 (e.g. copies of files 311, 312, 313 stored in SPP memory 310) so that a user may access and/or modify a local copy of the SPP data. The local copy (e.g. files 331, 332, and 333) may be accessed and/or modified while the connection to the SPP is unavailable, for example. In this way, portable bridge device 100 may function as a local file server for locally connected devices 230a, 230b.

As shown in FIG. 4a, in some embodiments, a user may select 412 certain data items to be stored and/or cached on portable bridge device 100 in anticipation of requiring offline access to the selected data when connections 215, 225 to SPP 200 (see e.g. FIG. 2b) are unavailable. For example, if a user is planning to visit a particular corporate client, the user may request that portable bridge device 100 "pull" one or more data files 311, 312, 313 stored on the SPP 200 associated with that particular client. In response to the request, the selected data files may be copied 414 to portable bridge device 100. Put another way, portable bridge device 100 requests the one or more data files, and initiates the transfer of this data (i.e. "pulls" the additional data) from SPP 200. In some embodiments, this request may be made via a user interface of a locally connected device 230 (e.g. facilitated by screen interface module 140).

As shown in FIG. 4b, in some embodiments, portable bridge device 100 may identify 424, based on data selected 422 by a user for storage and/or caching on the portable bridge device, additional data that the user may likely request to access and/or modify, and to pull the identified additional data (e.g. one or more data files 311, 312, 313 stored on SPP 200) to be stored and/or cached 426 on portable bridge device 100. Put another way, portable bridge device 100 identifies the additional data, and initiates the transfer of this data (i.e. "pulls" the additional data) from SPP 200. This identification 424 may be performed using, for example, a set of rules and/or a heuristic or behavior-based algorithm.

As one example, portable bridge device 100 may identify and download, in addition to the data selected by a user at 422, one or more data files stored in the same directory on SPP 200. For instance, if a user requests access to file 311 (e.g. a spreadsheet file) stored in SPP directory 320 for a particular corporate project and/or client, in addition to creating a local copy 331 of the requested file, portable bridge device 100 may pull file 312 (e.g. a presentation file) stored in the same SPP directory 320 and store and/or cache a local copy 332 on portable bridge device 100, in anticipation of the possibility that the user may also request access to the presentation file in the future.

As shown in FIG. 4c, in some embodiments, the SPP may identify 434, based on data selected 432 by a user for storage and/or caching on the portable bridge device, additional data that the user may likely request to access and/or modify, and to push the identified additional data (e.g. one or more data files 311, 312, 313 stored on the SPP 200) and store and/or cache 436 a local copy 331, 332, 333 on portable bridge device 100. Put another way, SPP 200 identifies the additional data, and initiates the transfer of this data (i.e. "pushes" the additional data) to portable bridge device 100. This identification 434 may be performed using, for example, a set of rules and/or a heuristic or behavior-based algorithm.

As one example, SPP 200 may copy (or push), in addition to the data selected by a user, one or more files stored in the same directory on SPP 200. For instance, if a user is accessing file 312 (e.g. a presentation file) stored in a SPP directory for a particular corporate project and/or client, SPP 200 may push file 311 (e.g. a spreadsheet file) stored in the same SPP directory 320 so that portable bridge device 100 can store and/or cache a local copy 332 on portable bridge device 100, in anticipation of the possibility that the user may also request access to the presentation file in the future.

By storing copies of certain data files from SPP 200 on portable bridge device 100, portable bridge device 100 is able to provide access to these local copies even when long-range connectivity to the Internet and/or SPP does not exist. This can be contrasted with typical cloud solutions, where a user may rely on a persistent and stable connection to a cloud to access files on an on-demand basis; in such systems, a user may experience significant problems accessing data when there is a loss of connectivity to the cloud.

In some embodiments, SPP 200 may provide scheduled and/or event-triggered backup of data that corresponds to data stored on portable bridge device 100. For example, when connectivity is established between portable bridge device 100 and SPP 200, a set of data records stored on portable bridge device 100 may be synchronized to match a corresponding set of data records stored on SPP 200.

In some embodiments, as shown in FIG. 4d, the data stored on portable bridge device 100 may automatically be synchronized 444 with data stored on SPP 200 in response to a connection 225 (or connections 205 and 215) between portable bridge device 100 and SPP 200 (see FIG. 2b) being established (or reestablished following a loss of connectivity) at 442.

This synchronization may be effected using one or more data synchronization techniques known to persons skilled in the art, and may involve a push of data from SPP 200 and/or a pull of data from portable bridge device 100. In some embodiments, a user may be prompted to address one or more synchronization conflicts via a user interface of a locally connected device 230a-c.

In some embodiments, this synchronization and/or backup may occur at certain times (e.g. every hour or at some other frequency, or at a particular time of day). Additionally or alternatively, synchronization and/or backup may be based on a determined location of the portable bridge device (e.g. when the portable bridge device is within certain geographical boundaries as determined by a GPS system, or connected to SPP 200 within a known WAN network or via a known WLAN router). For example, automatic synchronization 444 of certain files may be disabled if portable bridge device 100 is roaming on a foreign WAN, which may minimize data access charges.

In some embodiments, data stored on portable bridge device 100 may include e-mail or instant message data addressed to a user associated with portable bridge device 100. For example, portable bridge device 100 may be configured to receive and store an e-mail and/or instant message addressed to a user associated with portable bridge device 100, and to forward a notification that a message has been received, to the user via one or more locally connected devices 230a-c.

In some embodiments, portable bridge device 100 may be configured such that e-mail or instant message data stored on portable bridge device 100 may be accessed at a locally connected device 230a-c using a viewer message application (e.g. a thin-client, an ultra-thin client, a "zero client", a Run Time Environment (RTE) client, etc.). In this way, portable bridge device 100 may be considered a secure endpoint for e-mail or instant message data, as the e-mail or instant message data is not stored locally on any locally connected device 230a-c.

Figure 5A:
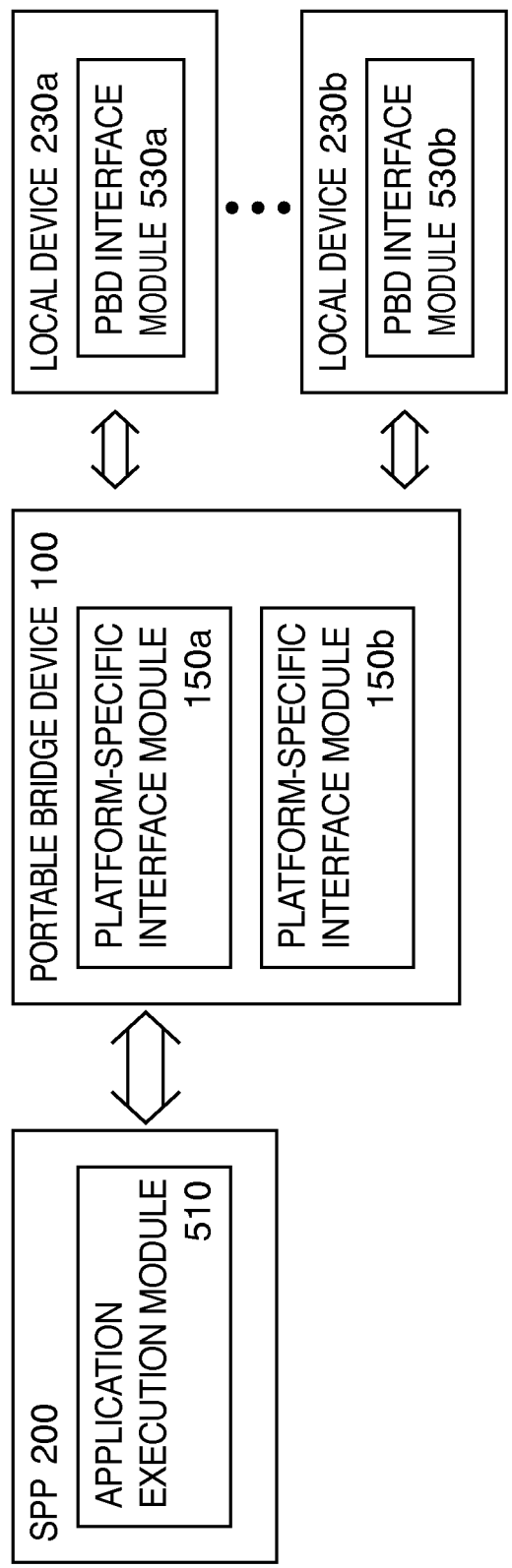
FIG. 5a is a block diagram of a portable bridge device, a storage and provisioning portal, and a plurality of local devices in accordance with at least one example embodiment.

Device Data Pre-Processing and Application Hosting—and—Multi-Platform/Multi-Device Interoperability Turning to FIG. 5a, in some embodiments, one or more applications that can be accessed by a locally connected device 230a, 230b may be running on a remote server or other device in the cloud (e.g. on SPP 200). In these embodiments, portable bridge device 100 may act as an interface between SPP 200 and one or more locally connected devices 230a, 230b. Put another way, an application may be executed by the processor of (and in a memory space of) SPP 200, with a portable bridge device interface module 530a, 530b, running on a locally connected device 230a, 230b, acting as a viewer (e.g. a thin-client, an ultra-thin client, a "zero client", a Run Time Environment (RTE) client, etc.) for receiving output from—and providing user input received at the locally connected device 230a, 230b to—SPP 200 via portable bridge device 100.

As shown in FIG. 6a, in some embodiments, portable bridge device 100 may receive data 602 from an application execution module 510 (FIG. 5a) running on SPP 200, and may reformat 604 (or otherwise process) the received data using one or more platform-specific interface modules 150a-b prior to forwarding 606 the reformatted and/or processed data to a portable bridge device interface module 530a running on locally connected device 230a. Put another way, in some embodiments, portable bridge device 100 does not simply act as a mere conduit or pipe for data between the locally connected devices and the SPP as the portable bridge device may be configured to perform additional processing.

In some embodiments, the one or more platform-specific interface modules 150a-b on portable bridge device 100 are each configured to format and/or process data for presentation on a different local device platform. In some embodiments, a portable bridge device interface module 530a, 530b running on a locally connected device 230a, 230b is configured to receive data from a platform-specific interface module 150a-b. In some embodiments, a portable bridge device interface module 530a, 530b may be made available for each of a plurality of operating systems, allowing portable bridge device 100 to support a variety of devices and/or platforms.

In some embodiments, a portable bridge device interface module 530a, 530b may comprise application software (also known as an application or "App") that is configured to execute on the operating system of a locally connected device 230a-c. In some embodiments, a portable bridge device interface module 530a, 530b may be provided as firmware (e.g. as part of a vehicle information and/or entertainment system, a home security system, an industry-specific tool (e.g. a forklift, barcode scanner, etc.)).

As shown in FIG. 6b, in some embodiments, portable bridge device 100 may, after receiving data 612 from an application execution module 510 running on SPP 200, determine 614 the local device platform of one or more locally connected devices 230a-c that are currently connected to portable bridge device 100, and may reformat 616 (or otherwise process) the received data based on the determined platform(s) using one or more platform-specific interface modules 150a-b prior to forwarding 618 the reformatted and/or processed data to a portable bridge device interface module 530a running on locally connected device 230a. It will be appreciated that in some embodiments, portable bridge device 100 may be configured to determine 614 the local device platform before receiving data 612 from an application execution module 510 running on SPP 200.

In some embodiments, portable bridge device 100 may be provided with a plurality of platform-specific interface modules 150a-b, each platform-specific interface module 150a-b being configured to work with a particular portable bridge device interface module 530a, 530b. In some embodiments, only one platform-specific interface module 150 is provided, the one platform-specific interface module 150 being configured to work with a plurality of different portable bridge device interface modules 530a, 530b.

In some embodiments, a portable bridge device interface module 530a, 530b may be customized for each platform or operating system, such that portable bridge device interface module 530 may display the data or applications being accessed from SPP 200 on the locally connected device 230a-c (via portable bridge device 100) in a user interface ("UI") that has the "look-and-feel" (e.g. the appearance and/or behavior of functional and stylistic graphical elements) of other applications running on the platform of that particular locally connected device 230a-c. For example, a portable bridge device interface module 530 configured to run on a device of Brand A, may present data received from SPP 200 via portable bridge device 100 in a window or screen that is stylistically consistent with the output of other applications (or "Apps") as would be commonly viewed on certain other devices of Brand A, while a portable bridge device interface module 530 configured to run on a device of Brand B (which may e.g. operate on a proprietary operating system) may present data from the SPP in a manner that is stylistically consistent with other applications as would be commonly viewed on certain other devices of Brand B.

In some embodiments, this look-and-feel data formatting may be performed by platform-specific interface modules 150a-b. Alternatively, this look-and-feel data formatting may be performed by a portable bridge device interface module 530a, 530b. In embodiments where one or more platform-specific interface modules 150a-b on portable bridge device 100 is configured to perform this look and feel data formatting, portable bridge device 100 may be configured to detect the platform of a locally connected device 230a-c, and select an appropriate platform-specific interface module 150 to process data received from SPP 200, based on the platform of the particular locally connected device 230a-c. In this way, portable bridge device 100 may be capable of providing a plurality of platform and/or device specific user interfaces by locally re-formatting data received from SPP 200, based on the platform of the particular locally connected device 230a-c.

In some embodiments, platform-specific interface modules 150a-b and/or portable bridge device interface modules 530a-b for each platform may be configured to display the data or applications being accessed from SPP 200 via portable bridge device 100 in a user interface that has a "look and feel" (e.g. the appearance and/or behavior of functional and stylistic graphical elements) that is stylistically independent of the device/platform being used. Put another way, data or applications accessed at a locally connected device 230 via portable bridge device 100 may be presented in a window or screen that is stylistically consistent with a user interface that is associated with the portable bridge device 100, rather than a user interface that is stylistically consistent with the platform, device brand, or operating system of the locally connected device 230 on which a portable bridge device interface module 530a-b is running.

Figure 5B:
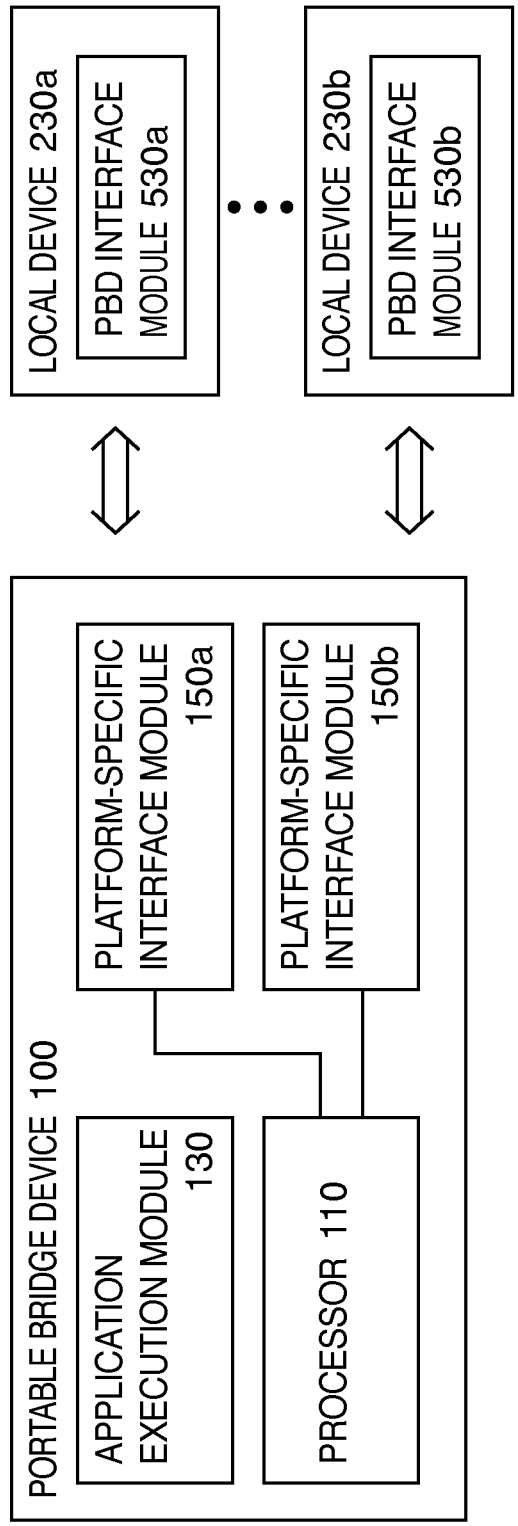
FIG. 5b is a block diagram of a portable bridge device, and a plurality of local devices in accordance with at least one example embodiment.

Turning to FIG. 5b, in some embodiments, data and/or applications presented on a locally connected device 230a, 230b may not be running on SPP 200 (as in FIG. 5a), but may instead be provided by application execution module 510 running on portable bridge device 100. Put another way, an application may be executed by the processor of (and in a memory space of) portable bridge device 100, with portable bridge device interface module 530 running on locally connected device 230a, 230b acting as a viewer (e.g. a thin-client, an ultra-thin client, a "zero client", a Run Time Environment (RTE) client, etc.) for receiving output from—and providing user input received at the locally connected device to—portable bridge device 100.

As shown in FIG. 6c, in some embodiments, portable bridge device 100 may execute 622 an application using application execution module 130, and may reformat 624 (or otherwise process) the application data using one or more platform-specific interface modules 150a-b, prior to forwarding 626 the reformatted and/or processed data to a portable bridge device interface module 530a running on locally connected device 230a.

In some embodiments, as shown in FIG. 6d, portable bridge device 100 may determine 634 the local device platform of one or more locally connected devices 230a, 230b that are currently connected to portable bridge device 100, and may reformat 636 (or otherwise process) the application data received 632 from application execution module 130, based on the determined platform(s) using one or more platform-specific interface modules 150a-b, prior to forwarding 638 the reformatted and/or processed data to a portable bridge device interface module 530a running on locally connected device 230a. It will be appreciated that in some embodiments, portable bridge device 100 may be configured to determine 634 the local device platform before receiving 632 data from application execution module 130.

In some embodiments, portable bridge device interface module 530a, 530b may act as a remote desktop client. For example, a portable bridge device interface module 530a, 530b may be configured to display a desktop user interface that is being virtualized and hosted on a remote server (e.g. SPP 200) or on portable bridge device 100.

In some embodiments, SPP 200 may be configured to forward or push new and/or updated portable bridge device interface modules 530a, 530b (which may include updates to existing portable bridge device interface modules 530a, 530b) to a locally connected device 230a-c via portable bridge device 100. As shown in FIG. 7a, portable bridge device 100 may be configured to receive 702 new and/or updated portable bridge device interface modules 530a, 530b from SPP 200. If portable bridge device 100 determines, at 704, that a locally connected device 230a-c for which the new and/or updated portable bridge device interface modules 530a, 530b is intended, is currently connected to the portable bridge device 100, then portable bridge device 100 may be configured to forward 706 the new and/or updated portable bridge device interface modules 530a, 530b to the locally connected device 230a-c.

Figure 7B:
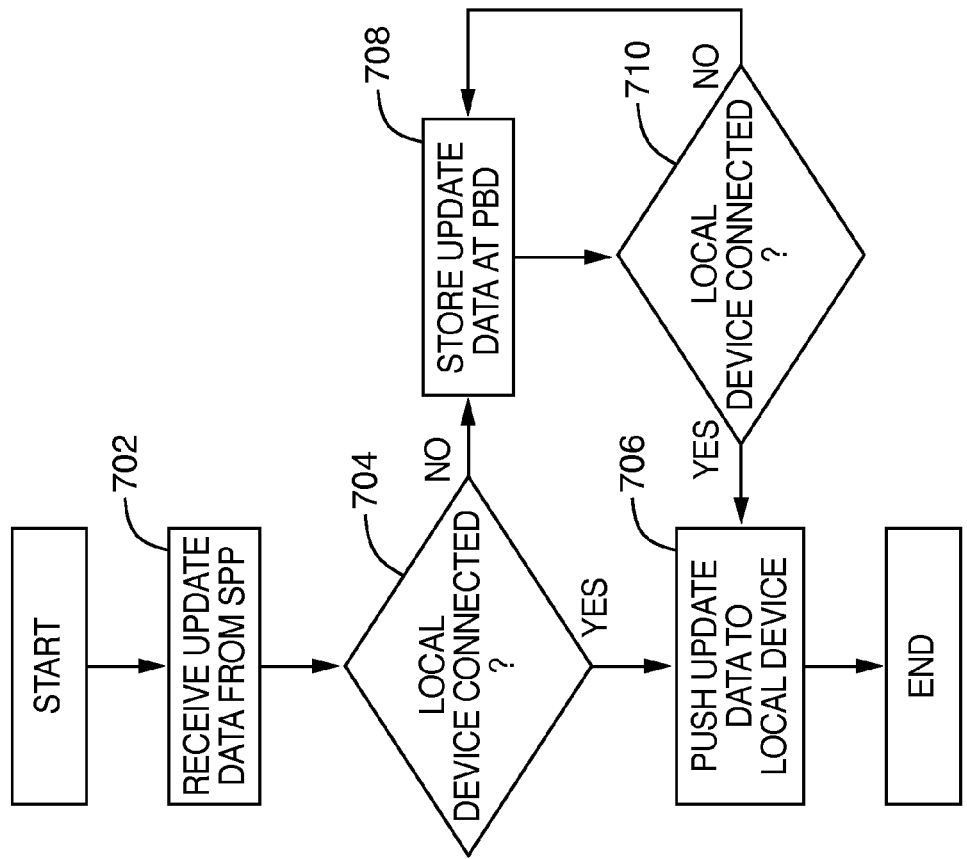
FIGS. 7a-7b are flow charts of methods of pushing new and/or updated portable bridge device interface modules to a locally connected device via a portable bridge device in accordance with some example embodiments.
Figure 7A:
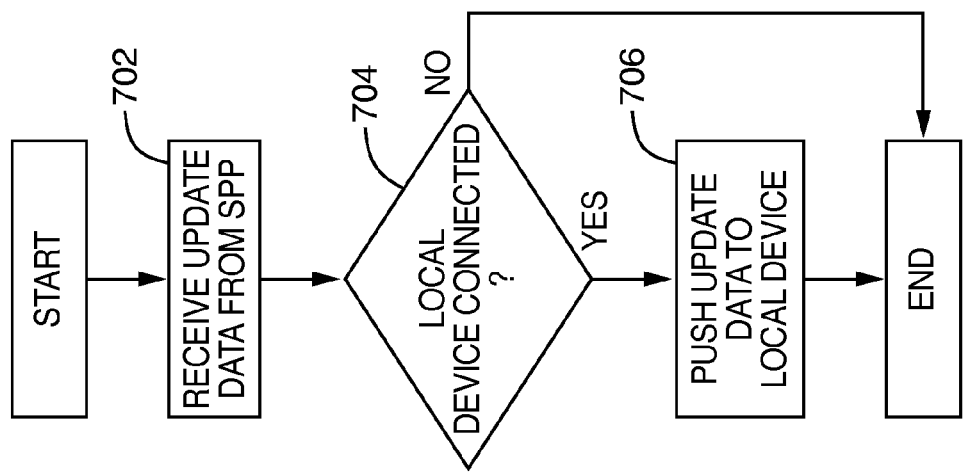

In some embodiments, as shown in FIG. 7b, if portable bridge device 100 determines, at 704, that no locally connected device 230a-c for which the new and/or updated portable bridge device interface modules 530a 530b is intended is currently connected to the portable bridge device 100, then portable bridge device 100 may be configured to store 708 the new and/or updated portable bridge device interface modules 530a, 530b. Subsequently, in response to detecting, at 710, that a locally connected device 230 for which the portable bridge device interface modules 530a, 530b is intended has connected to portable bridge device 100, portable bridge device 100 may be configured to forward 706 the new and/or updated portable bridge device interface modules 530a, 530b to locally connected device 230.

In this way, where the portable bridge device interface modules 530a, 530b are associated with an application, this application (or App) may be forwarded or pushed from SPP 200 and/or portable bridge device 100 to a locally connected device 230a-c, rather than the locally connected device 230a-c being dependent on a typical "App Store" or other source for obtaining or updating Apps generally.

In some embodiments, portable bridge device 100 and/or (SPP 200 via portable bridge device 100) may be configured to forward or push updated digital certificates and/or certificate revocation lists (CRLs) to a locally connected device 230a-c in a manner analogous to the manner in which new and/or updated portable bridge device interface modules 530a, 530b may be forwarded or pushed to a locally connected device 230a-c.

Device Security and Authentication

In some embodiments, portable bridge device 100 may require periodic authentication from a user to confirm that the user is authorized to access data stored on portable bridge device 100, and/or to confirm that portable bridge device 100 is authorized to be connected to SPP 200. Authentication and authorization may be controlled by, for example, security module 160 (see FIG. 1).

In some embodiments, portable bridge device 100 may be provided with a biometric sensor (e.g. a fingerprint scanner), and authentication of a user to portable bridge device 100 may require a successful biometric authentication. Alternatively or additionally, a user may be required to enter a password or other data to portable bridge device 100 via a user interface of a locally connected device 230a-c. Other authentication mechanisms may be employed.

In some embodiments, a user may be required to periodically re-authenticate a locally connected device 230a-c to portable bridge device 100, to confirm that the current user of the locally connected device 230a-c is authorized to access portable bridge device 100 and/or SPP 200.

In some embodiments, user authentication (to portable bridge device 100 and/or SPP 200) may be requested in response to a detected event. For example, if the short-range connection 235 (see FIG. 2b) between a particular locally connected device 230a-c and portable bridge device 100 is disconnected, that locally connected device 230a-c may be prevented from accessing applications or data from portable bridge device 100 and/or SPP 200 (e.g. to get private or corporate data) until a successful re-authentication is performed. This may provide an added level of security—for example, if a locally connected device 230a-c is lost or stolen, portable bridge device 100 may detect the lost connectivity and "lock out" that locally connected device 230a-c. Any locally connected device 230a-c that was, but is no longer connected to portable bridge device 100, is not left unprotected for a long period of time.

In some embodiments, portable bridge device 100 may be used to authenticate a user to a locally connected device 230a-c. For example, a user may be authenticated to their corporate laptop and/or desktop computer based on the establishment of a local network connection (e.g. via short-range communication module 180) between portable bridge device 100 and the user's computer. In some embodiments, authentication may also be based on another authentication factor (e.g. password or biometric authentication at the user's computer).

Device Sharing

In some embodiments, portable bridge device 100 is configured to be personal to a single user. That is, portable bridge device 100 may be configured to only allow one user to authenticate themselves to portable bridge device 100, although that user may authenticate themselves from—and interact with portable bridge device 100 from—more than one locally connected device 230a-c. For example, a user may interact with portable bridge device 100 (and/or SPP 200 via portable bridge device 100) using a mobile communication device, tablet computer, laptop computer, corporate desktop computer, vehicle information and/or entertainment system, etc. In this way, portable bridge device 100 provides secure access to a single user from a plurality of locally connected devices owned and/or operated by that user.

In some other embodiments, portable bridge device 100 may be configured to be shared amongst a plurality of users. For example, portable bridge device 100 may be configured to provide secure access to itself and/or to SPP 200, to a plurality of company employees, each employee using one or more locally connected devices to access portable bridge device 100. This configuration may be advantageous, for example, for a corporate team that is working at a client site and/or in a different country, where shared use of a single WAN connection via portable bridge device 100 may reduce bandwidth usage (and associated costs).

Figure 8A:
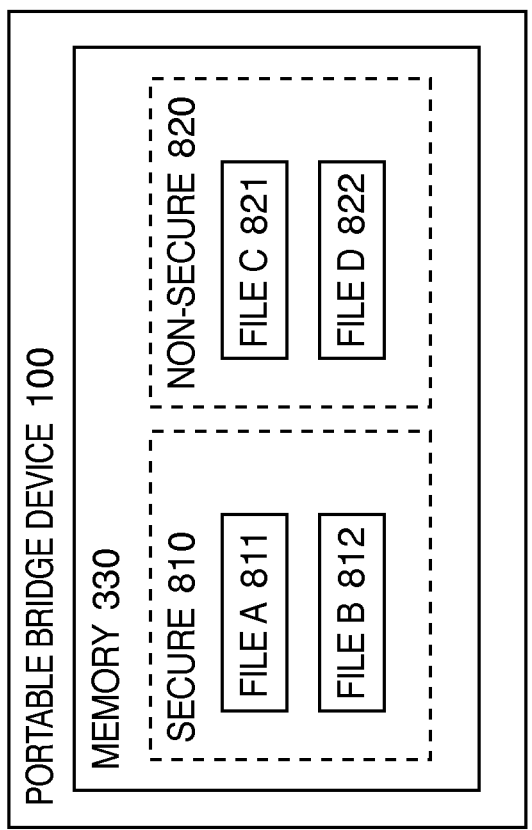
FIG. 8a-8b are block diagrams of a portable bridge device in accordance with at least one example embodiment.

In some embodiments, local memory 330 on portable bridge device 100 may be partitioned or otherwise "siloed" to isolate secure (e.g. corporate) data and/or applications from non-secure (e.g. personal) data and/or applications. As shown in FIG. 8a, in some embodiments, local memory 330 may be portioned into secure memory space 810 (containing one or more data or application files 811, 812) and non-secure memory space 820 (containing one or more non-secure data or application files 821, 822). Different memory management techniques may be used to provide the secure silos of memory (e.g. memory spaces 810, 820). While only two memory partitions are illustrated in FIG. 8*a* by way of example, persons skilled in the art will appreciate that any number of partitions may be provided.

Figure 8B:
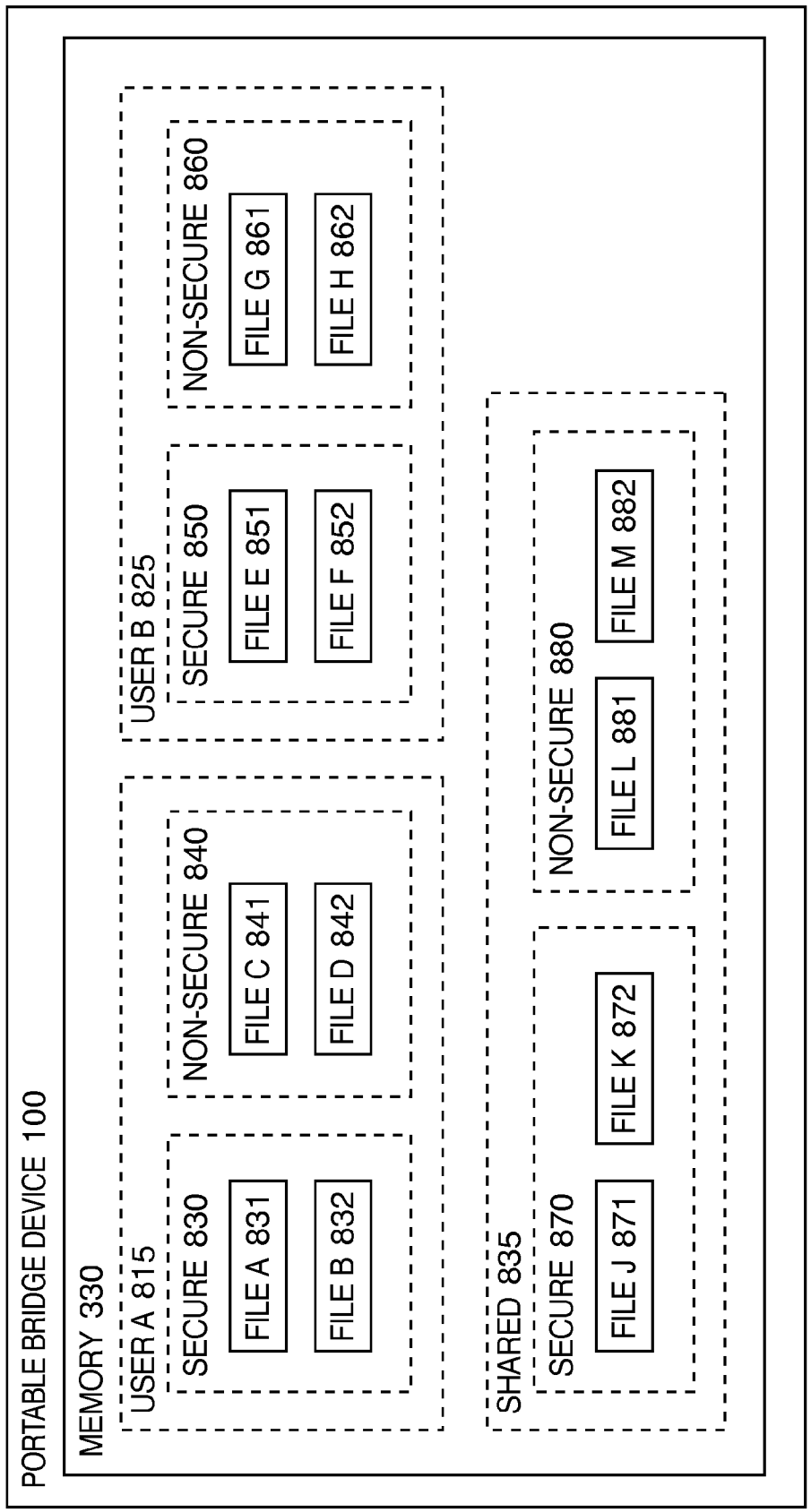

In some embodiments, varying levels of access restrictions (e.g. authentication requirements) may be required to access files stored in a particular memory space 810, 820. In some embodiments, varying levels of security (e.g. encryption) may be provided for each memory space 810, 820. The level of security and/or access requirements for a particular memory space 810, 820 may be determined by the user, or imposed by an administrator (e.g. through an IT policy).

Where portable bridge device 100 is shared by more than one user, one or more unique memory spaces may be provided and allocated to each specific user. As shown in FIG. 8*b*, in some embodiments, local memory 330 may be portioned into a first user memory space 815 (which may itself contain secure memory space 830 (containing one or more data or application files 831, 832) and non-secure memory space 840 (containing one or more non-secure data or application files 841, 842) and a second user memory space 825 (which may itself contain secure memory space 850 (containing one or more data or application files 851, 852) and non-secure memory space 860 (containing one or more non-secure data or application files 861, 862).

In some embodiments, portable bridge device 100 may also be configured to provide a shared memory space 835 that may be configured to allow access from any user that has authenticated themselves to portable bridge device 100 (e.g. for transferring data files between locally connected devices 230*a-c* via portable bridge device 100). Shared memory space 835 may itself contain secure shared memory space 870 (containing one or more data or application files 871, 872) and non-secure shared memory space 880 (containing one or more non-secure data or application files 881, 882). Additional shared memory spaces, separate from shared memory space 835, may also be provided in variant implementations. Furthermore, while only two user memory spaces 815, 825 are illustrated in FIG. 8*b* by way of example, persons skilled in the art will appreciate that any number of partitions may be provided.

Figure 9:
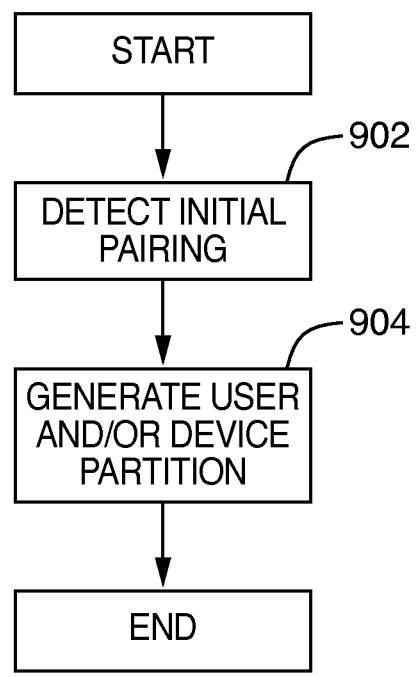
FIG. 9 is a flow chart of a method of generating a memory partition in accordance with at least one example embodiment.

In some embodiments, portable bridge device 100 may be configured to automatically initiate the creation of a user memory space 615, 625 specific to a user and/or a particular locally connected device 230*a-c* in response to the user and/or device being successfully authenticated to portable bridge device 100 for the first time. For example, as shown in FIG. 9, a partition in the local memory 330 on portable bridge device 100 may be generated 904 in response to an initial pairing or association 902 of a user and/or a locally connected device 230*a-c* with portable bridge device 100. In some embodiments, the creation of user memory spaces 815, 825 may be configured and/or regulated by an administrator (e.g. through an IT policy).

In some embodiments, two or more locally connected devices 230*a-c* may share a collaborative application or set of applications via portable bridge device 100. For example, if locally connected device 230*a* and locally connected device 230*b* were both connected to portable bridge device 100 via short-range connections 235, each locally connected device 230*a*, 230*b* may be configured with a shared whiteboard application (and/or a post-it board application or the like) that may allow users of locally connected devices 230*a*, 230*b* to view and/or edit a shared virtual whiteboard while both devices are connected to the portable bridge device. In some embodiments, portable bridge device 100 may host the whiteboard (e.g. data would only be stored on portable bridge device 100), with locally connected devices 230*a*, 230*b* running whiteboard viewer (e.g. thin-client) applications. In some embodiments, portable bridge device 100 may be configured to update the virtual whiteboard based on data representing user markups received at portable bridge device 100 from locally connected devices 230*a*, 230*b* via local connections 235.

In some embodiments, one locally connected device 230*a*, 230*b* may be configured to host the whiteboard (e.g. data would be stored on the host locally connected device 230*a*, 230*b*), with other locally connected devices 230*a*, 230*b* attending the whiteboard session (e.g. providing data representing user markups to the host device, and receiving data representing markups by other users from the host device). In some embodiments, portable bridge device 100 may simply act as a data conduit (or pipe) between locally connected devices 230*a*, 230*b*. Alternatively, locally connected devices 230*a*, 230*b* may be configured to communicate directly once the collaborative session has been initiated; in these embodiments, portable bridge device 100 may not be needed once portable bridge device 100 has helped to initiate or establish the connection between locally connected devices 230*a*, 230*b*.

In some embodiments, each locally connected device 230*a*, 230*b* may be configured with a shared meeting application that may allow users of locally connected devices 230*a*, 230*b* to view and/or edit messages or other data in a virtual meeting space. In some embodiments, portable bridge device 100 may host the meeting (e.g. data would only be stored on portable bridge device 100), with locally connected devices 230*a*, 230*b* running meeting viewer (e.g. thin-client) applications. In some embodiments, portable bridge device 100 may be configured to facilitate file sharing between locally connected devices 230*a*, 230*b* via local connections 235. For example, if two users both joined a virtual meeting being hosted on portable bridge device 100, using locally connected devices 230*a* and 230*b*, respectively, portable bridge device 100 may be configured such that a first user may be able to copy a data file from locally connected device 230*a* into the virtual meeting space hosted by portable bridge device 100. Subsequently, a second user may be able to access this data file, and optionally create a copy of the data file to her or his locally connected device 230*b*. Rules and permissions relating to transferring and/or copying data files between devices may be determined by one or more of the users attending the virtual meeting, or imposed by an administrator (e.g. through an IT policy), for example.

Contextual Notifications

As discussed above with respect to FIG. 1, in some embodiments, portable bridge device 100 may be provided with one or more input and/or output modules 190*a-b* configured to drive one or more input, output, or input/output devices. In embodiments where portable bridge device 100 is provided with one or more output devices, portable bridge device 100 may provide an event notification to a user directly (as opposed to providing a notification via a locally connected device 230*a-c* communicatively coupled to portable bridge device 100).

For example, portable bridge device 100 may provide a visual, audible, and/or vibratory indicator to notify a user that a WAN connection to SPP 200 has been established (or re-established), or that the connection has been terminated, as the case may be. As another example, portable bridge device 100 may provide a notification that an e-mail or instant message has been received at portable bridge device 100 (e.g. from SPP 200), and is available for access using one or more of locally connected devices 230*a-c*.

In some embodiments, portable bridge device 100 may provide notifications contemporaneously with notifications provided via one or more locally connected devices 230a-c. For example, each of portable bridge device 100 and a locally connected device 230a-c may separately provide a notification to indicate that a LAN connection 235 has been established (or reestablished) between portable bridge device 100 and the (now) locally connected device 230a-c.

Alternatively, in some embodiments, only one of portable bridge device 100 and locally connected device 230a-c may provide a notification of certain events. For example, only a (formerly) locally connected device 230a-c (and not portable bridge device 100) may provide a notification to indicate that LAN connection 235 has been disconnected. As another example, only portable bridge device 100 (and not a locally connected device 230a-c) may provide a notification to indicate that WAN connection 215 has been established, reestablished, or disconnected.

In some embodiments, portable bridge device 100 may be configured to provide a notification based on whether one or more locally connected devices 230 are currently connected to portable bridge device 100. For example, as shown in FIG. 10a, in response to detecting 1002 an event for which notification is to be provided to a user (e.g. notification that an instant or e-mail message addressed to a user of portable bridge device 100 has been received at portable bridge device 100), portable bridge device 100 may be configured to determine 1004 if a locally connected device 230a-c is currently connected, and configured to provide 1006 a notification at portable bridge device 100 (e.g. via one or more input and/or output modules 190a-b) if there is currently no active short-range connection 235 to one or more locally connected devices 230a-c. If, at 1004, it is determined that a short-range connection 235 to one or more locally connected devices 230a-c is currently active, portable bridge device 100 may be configured to forward 1008 notification data (e.g. data related to the detected event) to the locally connected device 230a-c (e.g. a tablet computer), without providing a notification at portable bridge device 100.

In some embodiments, portable bridge device 100 may be configured to provide a notification based on a determined context of portable bridge device 100 and/or one or more locally connected devices 230a-c. For example, portable bridge device 100 may be configured to forward a notification regarding an instant or e-mail message addressed to a user of portable bridge device 100 via a locally connected device 230a-c (e.g. a tablet computer) associated with that user, without initially providing a notification at portable bridge device 100 (e.g. via one or more input and/or output modules 190a-b). However, as shown in FIG. 10b, portable bridge device 100 may be configured to request confirmation 1010 from a locally connected device 230a-c that the notification was received by a user (e.g. that an instant message was displayed on a display of the locally connected device 230a-c), and to provide 1006 a notification at portable bridge device 100 if the notification (e.g. instant message) was not viewed on the locally connected device 230a-c, for example, within a certain time frame (e.g. 5 minutes).

As another example, portable bridge device 100 may be configured to initially provide a notification regarding an instant or e-mail message addressed to a user of portable bridge device 100 at portable bridge device 100 (e.g. via one or more input and/or output modules 190a-b), without forwarding the notification to a locally connected device 230a-c. However, portable bridge device 100 may be configured to forward the notification to a locally connected device 230a-c if the notification was not acknowledged by a user at portable bridge device 100 within a certain time frame (e.g. 5 minutes), for example.

As another example, as shown in FIG. 10c, in response to detecting 1002 an event for which notification is to be provided to a user (e.g. notification that an instant or e-mail message addressed to a user of portable bridge device 100 has been received at portable bridge device 100), portable bridge device 100 may be configured to determine 1004 if a locally connected device 230a-c (e.g. a tablet computer) associated with that user is currently connected, and to determine 1012 if a portable bridge device interface module 530a, 530b is currently running on that locally connected device 230a-c. If it is determined that a portable bridge device interface module 530a, 530b is currently running on that locally connected device 230a-c for which the notification relates, portable bridge device 100 may be configured to forward 1008 notification data (e.g. data related to the detected event) to that locally connected device 230 (e.g. a tablet computer), without providing a notification at portable bridge device 100.

In some embodiments, portable bridge device 100 may be configured to forward a notification via a locally connected device 230a-c, without initially providing a notification at portable bridge device 100, if a portable bridge device interface module 530a, 530b is currently running in the foreground (e.g. not as a background process) on that locally connected device 230a-c. For example, certain locally connected devices 230a-c (e.g. mobile communication devices running certain operating systems) may be configured to only display one foreground program or application to a user at a time. If a portable bridge device interface module 530a, 530b is running on such a locally connected device, but not as a foreground program, a user of that device may not receive the notification in a timely manner.

Contextual Priority

In some instances, a user may be interacting, directly or indirectly, with more than one locally connected device 230a-c contemporaneously. For example, referring to FIG. 2b, a user may be alternating, or multi-tasking, between interacting with a keyboard and/or mouse of a laptop computer 230a, and interacting with a keypad and/or a touchscreen of a mobile communication device 230c. As a further example, a user may be browsing the Internet on a tablet computing device 230b while accessing e-mail on mobile communication device 230c.

In some embodiments, portable bridge device 100 may forward or prioritize a notification and/or message (e.g. from SPP 200) based on a determined context of portable bridge device 100 and/or one or more locally connected devices 230a-c. This determined context may take into account at least one of the following factors, for example: the number and type of locally connected devices 230 (e.g. "what devices are currently connected to portable bridge device 100"?); the status of each of the locally connected devices 230a-c (e.g. "what are locally connected devices 230a-c doing"?); and the status of one or more portable bridge device interface modules 530a, 530b running on each of locally connected devices 230a-c (e.g. "is portable bridge device interface module 530a, 530b currently running in the foreground (e.g. not as a background process) on one or more of locally connected devices 230a-c"?).

For example, portable bridge device 100 may be configured to forward an instant or e-mail message addressed to the user of portable bridge device 100 via locally connected device 230a (e.g. a laptop computer) only if an instant messaging or e-mail application is currently running on that locally connected device 230a. As another example, portable bridge device 100 may be configured to forward an event notification only to those locally connected devices 230*a-c* on which their respective portable bridge device interface modules 530*a*, 530*b* is currently running in the foreground (i.e. not as a background process).

As noted above, portable bridge device 100 may be configured to determine a context based on the type of locally connected devices 230. For example, if portable bridge device 100 detects that it is currently connected to a particular type of locally connected device (e.g. a vehicle information and/or entertainment system), portable bridge device 100 may be configured to forward messages and/or event notifications to that locally connected device (e.g. a hands-free system user interface provided by vehicle information and/or entertainment system) and not to other locally connected devices 230*a-c*. In some embodiments, portable bridge device 100 may be further configured to determine the context based on whether the vehicle (of the vehicle information and/or entertainment system), to which portable bridge device 100 is connected, is in gear and/or in motion.

In some embodiments, portable bridge device 100 may be configured to forward an instant or e-mail message addressed to the user of portable bridge device 100 via whichever one locally connected device 230*a-c* most recently received a user input. For example, if portable bridge device 100 determines that an active connection exists to mobile communication device 230*c* and tablet computing device 230*b*, and the most recent user input (e.g. keystroke and/or trackpad touch) received at mobile communication device 230*c* was four minutes ago, and the most recent user input (e.g. touchscreen touch) received at tablet computing device 230*b* was one minute ago, portable bridge device 100 may be configured to forward the instant or e-mail message to tablet computer 230*b* but not to mobile communication device 230*c*.

Support for Work-Specific Tools

In addition to more commonly-used computing devices such as desktop computers, tablet computing devices, etc., portable bridge device 100 may be configured to operate with one or more work-specific tools, such as a fork lift used in a company warehouse, or a delivery vehicle used by a courier company, for example.

Consider a large container store that has a warehouse. Many people might operate a particular forklift within the warehouse. The forklift may be equipped with a work-specific tool (e.g. a type of mobile communication device that may be considered as a locally connected device). In at least one embodiment, a first forklift operator may be provided with a portable bridge device 100 carried on their belt. During operation of the forklift, a platform-specific interface module 150 on portable bridge device 100 may be configured to present a user interface on a display of the work-specific tool via short-range connection 235. Accordingly, the work-specific tool may be able to utilize applications running on portable bridge device 100 and/or SPP 200, and may be able to send and/or receive secure data to and/or from portable bridge device 100 and/or SPP 200.

Example Mobile Communication Device

Figure 11:
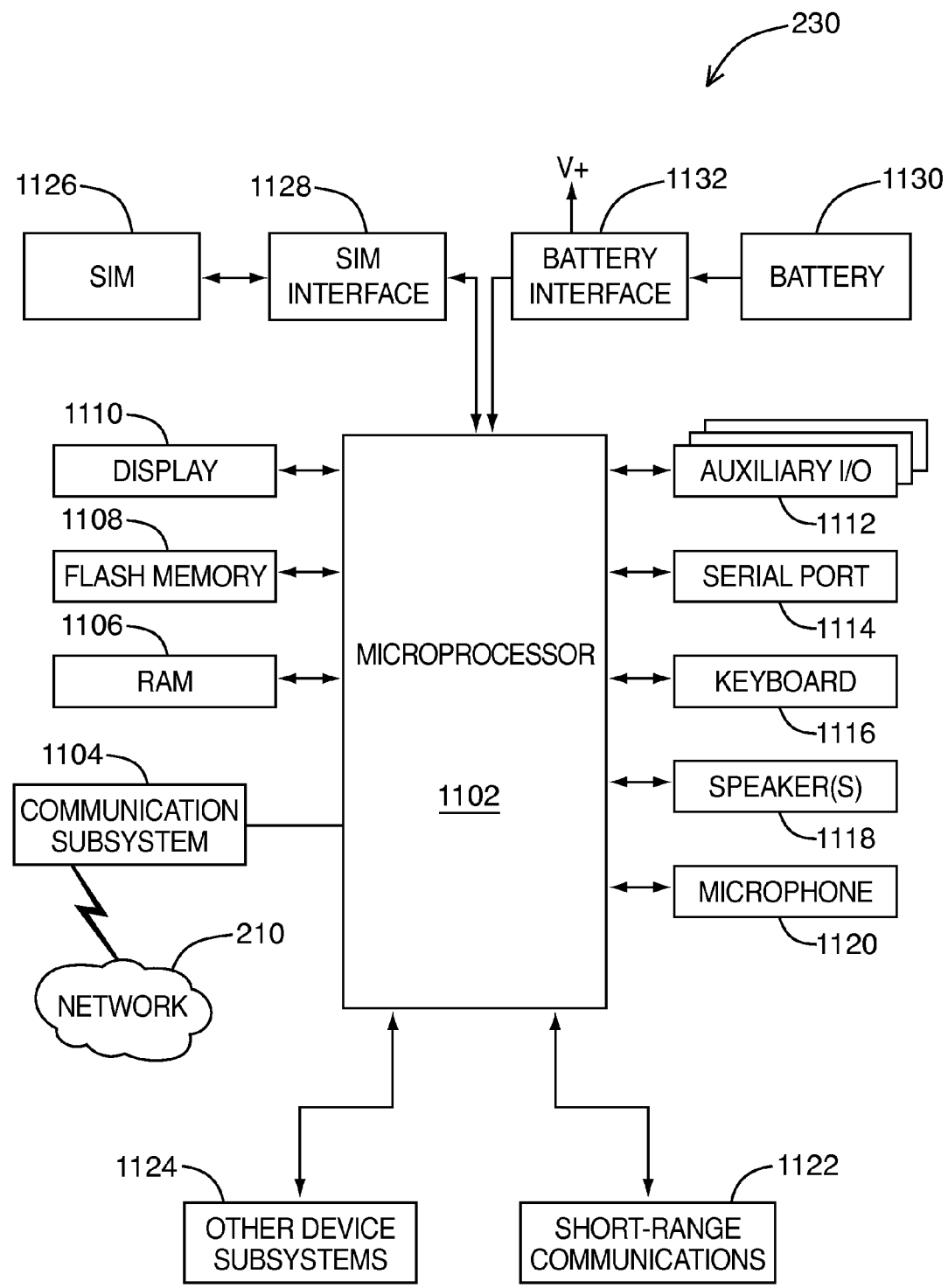
FIG. 11 is a block diagram of a mobile device in one example implementation.
Figure 12:
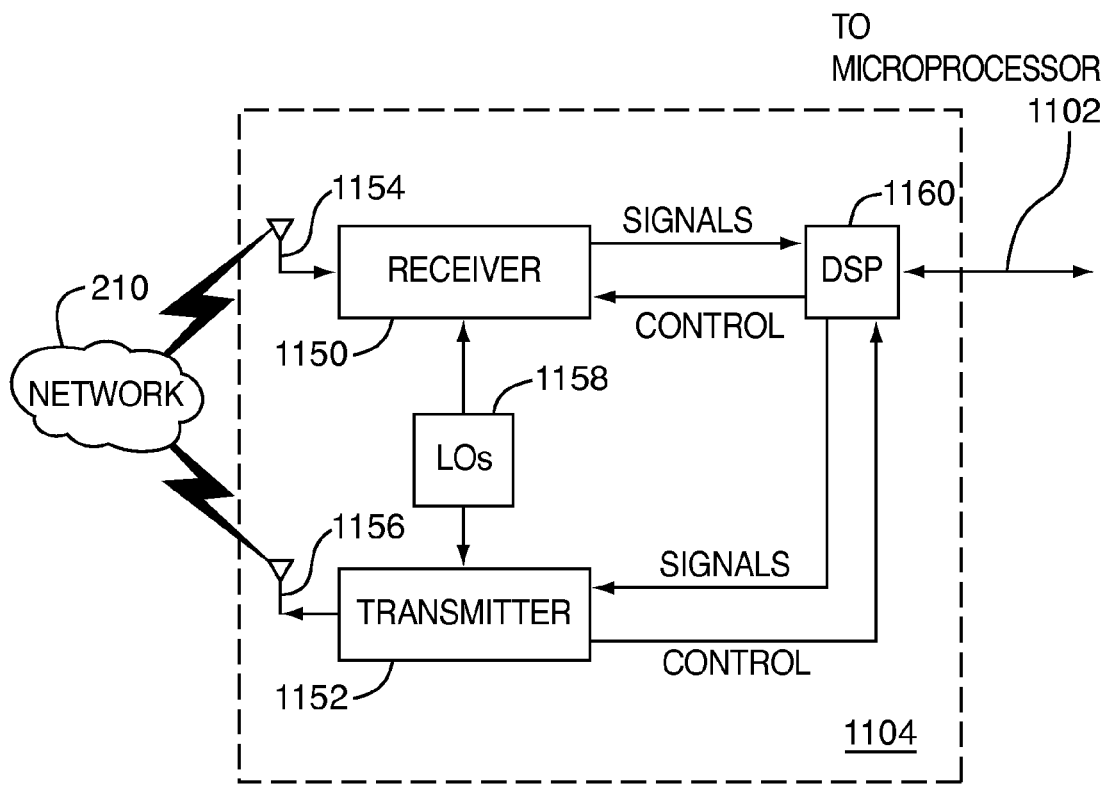
FIG. 12 is a block diagram of a communication sub-system component of the mobile device of FIG. 11.
Figure 13:
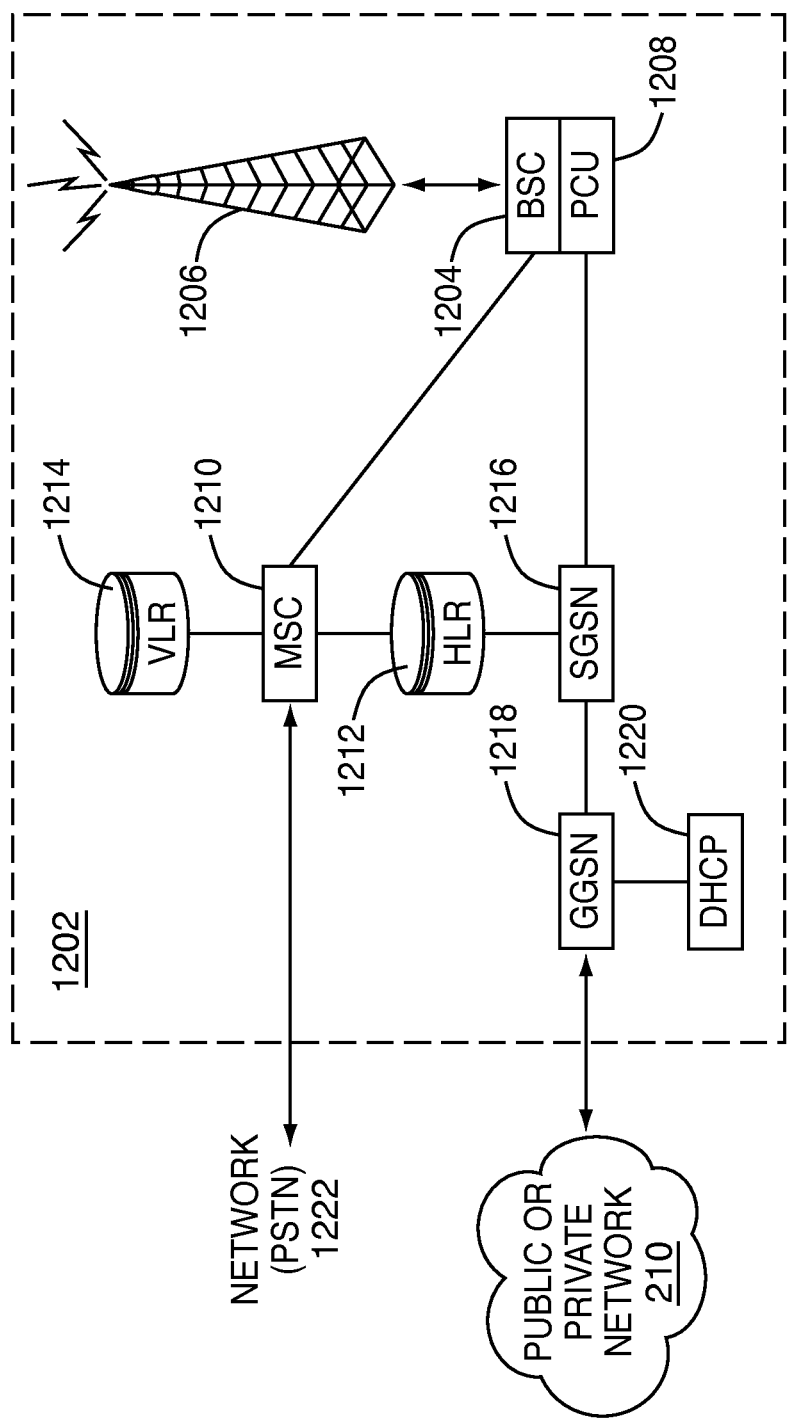
FIG. 13 is a block diagram of a node of a wireless network in one example implementation.

One or more of the devices discussed above (e.g. one or more locally connected devices 230) may be mobile communication devices. Reference is now made to FIGS. 11 to 13 for a general description of an example structure of a mobile communication device and how the mobile device may operate and communicate with other devices. The mobile device (sometimes referred to alternatively as a "mobile station" or "portable electronic device") may comprise a two-way communication device with advanced data communication capabilities having the capability to communicate with other computer systems and devices. The mobile device may include the capability for voice communications, data communications or a combination of the two. Depending on the functionality provided by the mobile device, it may be referred to as a smartphone, a data messaging device, a two-way pager, a cellular telephone with data messaging capabilities, a wireless Internet appliance, a laptop computer, a tablet computer, a media player (such as an MP3 player), an electronic book reader or a data communication device (with or without telephony capabilities). In some embodiments, the mobile device may be mounted, installed, or otherwise integrated with a vehicle. Non-limiting examples of a vehicle include: a car, truck, or other automobile; an airplane or other aircraft; and a boat, ship, or other marine vessel. Although a mobile device is described herein by way of illustration, embodiments described herein may be applicable to other computing devices other than mobile devices. For example, embodiments described herein may be applied to other computing platforms that are provided with inactivity timers in variant implementations.

Referring now to FIG. 11 specifically, a block diagram of a mobile device in one example implementation is shown generally as 230. Mobile device 230 comprises a number of components, the controlling component typically being microprocessor 1102. Microprocessor 1102 controls the overall operation of mobile device 230. In some embodiments, certain communication functions, including data and voice communications, are performed through communication subsystem 1104. Communication subsystem 1104 is configured to receive messages from and send messages to a wireless network 210.

In this example implementation of mobile device 230, communication subsystem 1104 may be configured for cellular communication in accordance with the Global System for Mobile Communication (GSM) and General Packet Radio Services (GPRS) standards. The GSM/GPRS wireless network is used worldwide and it is expected that other standards such as Enhanced Data GSM Environment (EDGE) and Universal Mobile Telecommunications Service (UMTS) may be employed. These standards are mentioned as examples only, and other standards may be employed.

It will be understood by persons skilled in the art that the described embodiments are intended to use any other suitable standards that are developed in the future. The wireless link connecting communication subsystem 1104 with network 210 may represent one or more different Radio Frequency (RF) channels, operating according to defined protocols specified for GSM/GPRS communications. With newer network protocols, these channels may be capable of supporting both circuit switched voice communications and packet switched data communications.

The wireless network associated with mobile device 230 may comprise a GSM/GPRS wireless network in one example implementation of mobile device 230; however, other wireless networks may also be associated with mobile device 230 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2100 networks, GSM/GPRS networks (as mentioned above), and n-generation (e.g. 2.5G, 3G, 3.5G, 4G, etc.) networks like EDGE, UMTS, High-Speed Downlink Packet Access (HSDPA), High-Speed Uplink Packet Access (HSUPA), High-Speed Packet Access (HSPA), Long Term Evolution (LTE), 3GPP LTE, LTE Advanced, WiMax, and Flash-OFDM, etc. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 1102 generally also interacts with additional subsystems, which may include one or more of Random Access Memory (RAM) 1106, flash memory 1108, display 1110, auxiliary input/output (I/O) subsystem 1112, serial port 1114, keyboard 1116, one or more speakers 1118, microphone 1120, short-range communication subsystem 1122 and other device subsystems 1124.

Some of the subsystems of mobile device 230 perform communication-related functions, whereas other subsystems may provide "resident" or on-device functions. By way of example, display 1110 and keyboard 1116 may be used for both communication-related functions, such as entering a text message for transmission over network 210, and device-resident functions such as a calculator, media player or task list. Operating system software used by microprocessor 1102 is typically stored in a persistent store such as flash memory 1108, which may alternatively be a read-only memory (ROM) or similar storage element (not shown). Those skilled in the art will appreciate that the operating system, specific device applications, or parts thereof, may be temporarily loaded into a volatile store such as RAM 1106.

In some embodiments, mobile device 230 may send and receive communication signals over network 210 after network registration or activation procedures have been completed. Network access is associated with a subscriber or user of a mobile device 230. To identify a subscriber, mobile device 230 may use a Subscriber Identity Module or "SIM" card 1126 inserted in a SIM interface 1128 in order to communicate with a network. SIM 1126 is one type of a conventional "smart card" used to identify a subscriber of mobile device 230 and to personalize the mobile device 230, among other things. Without SIM 1126, mobile device 230 may not be fully operational for communication with network 210.

By inserting SIM 1126 into SIM interface 1128, a subscriber may have access to subscribed services. Services could include, for example and without limitation: web browsing and messaging such as e-mail, voice mail, Short Message Service (SMS), media transfers (such as music downloading or streaming), and Multimedia Messaging Services (MMS). More advanced services may include: point of sale, field service and sales force automation. SIM 1126 may include a processor and memory for storing information. Once SIM 1126 is inserted in SIM interface 1128, it may be coupled to microprocessor 1102. In order to identify the subscriber, SIM 1126 may contain some user parameters such as an International Mobile Subscriber Identity (IMSI). A typical advantage of using SIM 1126 is that subscribers are not necessarily bound by any single physical mobile device. SIM 1126 may store additional subscriber information for a mobile device as well, including datebook (or calendar) information and recent call information. In certain embodiments, SIM 1126 may use a different type of user identifier, and may be integral to mobile device 230 or not present at all. By way of further examples, a Universal Integrated Circuit Card (UICC), eUICC (Embedded UICC), Removable User Identity Module (R-UIM), CDMA Subscriber Identity Module (CSIM), or Universal Subscriber Identity Module (USIM) may be employed.

Mobile device 230 includes a power pack that supplies power to electronic components and that supports portability.

The power pack may be of any type, but for clarity it will be assumed that mobile device 230 is a battery-powered device and includes a battery interface 1132 for receiving one or more rechargeable batteries 1130. Battery interface 1132 is coupled to a regulator (not shown), which assists battery 1130 in providing power V+ to mobile device 230. Although current technology makes use of a battery, future technologies such as micro fuel cells may provide the power to mobile device 230. In some implementations, mobile device 230 may be solar-powered.

Microprocessor 1102, in addition to its operating system functions, enables execution of software applications on mobile device 230. A set of applications that control basic device operations, including data and voice communication applications, will normally be installed in flash memory 1108 (or other non-volatile storage) on mobile device 230 during its manufacture.

Additional applications may also be loaded onto mobile device 230 through network 210, auxiliary I/O subsystem 1112, serial port 1114, short-range communications subsystem 1122, or the other device subsystems 1124. This flexibility in application installation increases the functionality of mobile device 230 and may provide enhanced on-device functions, communication-related functions, or both. For example, secure communication applications may enable electronic commerce functions and other such financial transactions to be performed using mobile device 230. Numerous other types of applications may be loaded onto mobile device 230 or other computing devices, including without limitation, messaging applications (e.g. e-mail, text, instant, video, etc.), voice communication applications, calendar applications, address book applications, utility applications, browser applications, media player (e.g. audio, video, etc.) applications, social network applications, camera applications, gaming applications, productivity applications, etc.

Serial port 1114 enables a subscriber to set preferences through an external device or software application, and may extend the capabilities of mobile device 230 by providing for information or software downloads to mobile device 230 other than through a wireless communication network. The alternate download path may, for example, be used to load an encryption key onto mobile device 230 through a direct and thus, a typically more reliable and trusted connection, to provide secure device communication.

It should be noted that the term "download" and forms thereof as used herein, in the specification and in the claims, are used generally to describe a transfer of data from one system to another, and is not intended to be limiting with regards to the origin or destination of the transfer, for example. Accordingly, where the term "download" and forms thereof are used herein, it is intended to encompass other forms of transfers including, for example, an "upload" or a "sideload" of data (e.g. a Universal Serial Bus (USB) sideload).

Short-range communications subsystem 1122 generally provides for wireless device connections to enable communication between mobile device 230 and different systems or devices, without the use of network 210. For example, subsystem 1122 may include an infrared device and associated circuits and components for short-range communication. Examples of short range communication would include standards developed by the Infrared Data Association (IrDA), Near Field Communication (NFC), Bluetooth, and the 802.11 family of standards developed by IEEE.

In use, a received signal such as a text message, an e-mail message, or a web page download may be processed by communication subsystem 1104 and input to microprocessor

1102. Microprocessor 1102 may then process the received signal for output to display 1110, or additionally or alternatively, to auxiliary I/O subsystem 1112. A subscriber may also compose data items, such as e-mail messages, for example, using keyboard 1116 in conjunction with display 1110, and possibly auxiliary I/O subsystem 1112. Keyboard 1116 may be an alphanumeric keyboard and/or telephone-type keypad, for example. A composed item may be transmitted over network 210 through communication subsystem 1104.

Auxiliary I/O subsystem 1112 may be associated with devices such as, for example: a touch screen, a mouse, an infrared fingerprint detector, or a roller wheel with a dynamic button actuation (e.g. pressing) capability. Auxiliary I/O subsystem 1112 may also include an orientation sensor for determining a relative spatial orientation of mobile device 230 (e.g. a particular spatial orientation of mobile device 230 in the physical world) and for detecting a change in the device's spatial orientation. Such an orientation sensor can be, for example an accelerometer, a tilt sensor, an inclinometer, a gravity-based sensor, or a Micro-Electro-Mechanical (MEM) system that can include one of the above types of sensors on a micro-scale. Further, auxiliary I/O subsystem 1112 may comprise a two-dimensional navigation (or scrolling) component, such as for example: a track ball, a joystick or a directional pad, each optionally with a dynamic button actuation (e.g. pressing) capability. User input components comprised in auxiliary I/O subsystem 1112 may be used by the user to navigate and interact with a user interface of mobile device 230.

For voice communications, received signals may be output to the one or more speakers 1118, and signals for transmission may be generated by microphone 1120. Alternative voice or audio I/O subsystems, such as a voice message recording subsystem, may also be implemented on mobile device 230. Although voice or other audio signal output may be accomplished primarily through the one or more speakers 1118, display 1110 may also be used to provide additional information such as the identity of a calling party, duration of a voice call, or other call-related information. Microphone 1120 can receive a supply of power, in the form of a bias voltage and bias current, from a rechargeable battery (e.g. battery 1130). Different types and configurations of microphone 1120 can be incorporated into the mobile device 230.

Referring now to FIG. 12, a block diagram of an example communication subsystem 1104 of FIG. 11 is shown. In this example, communication subsystem 1104 comprises a receiver 1150, a transmitter 1152, one or more embedded or internal antenna elements 1154, 1156, Local Oscillators (LOs) 1158, and a processing module such as a Digital Signal Processor (DSP) 1160.

The particular design of communication subsystem 1104 is dependent upon the network 210 in which mobile device 230 is intended to operate, thus it should be understood that the design illustrated in FIG. 12 serves only as one example. Signals received by antenna 1154 through network 210 are input to receiver 1150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 1160. In a similar manner, signals to be transmitted are processed, including modulation and encoding, by DSP 1160. These DSP-processed signals are input to transmitter 1152 for digital-to-analog (D/A) conversion, frequency up conversion, filtering, amplification and transmission over network 210 via antenna 1156. DSP 1160 not only processes communication signals, but also provides for receiver and transmitter control. For example, the gains applied to communication signals in receiver 1150 and transmitter 1152 may be adaptively controlled through automatic gain control algorithms implemented in DSP 1160.

The wireless link between mobile device 230 and a network 210 may comprise one or more different channels, typically different RF channels, governed by associated protocols used between mobile device 230 and network 210. An RF channel is a limited resource that should generally be conserved, typically due to limits in overall bandwidth and limited battery power of mobile device 230.

When mobile device 230 is fully operational, transmitter 1152 is typically keyed or turned on only when it is sending to network 210 and is otherwise turned off to conserve resources. Similarly, receiver 1150 is typically periodically turned off to conserve power until it is needed to receive signals or information (if at all) during designated time periods.

Referring now to FIG. 13, a block diagram of a node of a wireless network is shown as 1202. In this example, the network and its components are described for operation with General Packet Radio Service (GPRS) and Global Systems for Mobile (GSM) technologies. However, it should be understood that the network can be implemented in accordance with other communication protocols. In practice, network 210 comprises one or more nodes 1202. Mobile device 230 typically communicates with a node 1202 within wireless network 210. The node 1202 may be configured in accordance with GPRS and GSM technologies. Node 1202 may include a base station controller (BSC) 1204 with an associated tower station 1206, a Packet Control Unit (PCU) 1208 added for GPRS support in GSM, a Mobile Switching Center (MSC) 1210, a Home Location Register (HLR) 1212, a Visitor Location Registry (VLR) 1214, a Serving GPRS Support Node (SGSN) 1216, a Gateway GPRS Support Node (GGSN) 1218, and a Dynamic Host Configuration Protocol (DHCP) 1220. This list of components is not meant to be an exhaustive list of the components of every node 1202 within a GSM/GPRS network, but rather a list of components that may be commonly used in communications through network 210.

In a GSM network, MSC 1210 may be coupled to BSC 1204 and to a landline network, such as a Public Switched Telephone Network (PSTN) 1222 to satisfy circuit switched requirements. The connection through PCU 1208, SGSN 1216 and GGSN 1218 to the public or private network (Internet) 210 (also referred to herein generally as a shared network infrastructure) represents the data path for GPRS capable mobile devices. In a GSM network extended with GPRS capabilities, BSC 1204 may also contain a Packet Control Unit (PCU) 1208 that connects to SGSN 1216 to control segmentation, radio channel allocation and to satisfy packet switched requirements. To track mobile device location and availability for both circuit switched and packet switched management, HLR 1212 is typically shared between MSC 1210 and SGSN 1216. Access to VLR 1214 is typically controlled by MSC 1210.

Station 1206 may be a fixed transceiver station, in which case the station 1206 and BSC 1204 together may form the fixed transceiver equipment. The fixed transceiver equipment generally provides wireless network coverage for a particular coverage area commonly referred to as a "cell". The fixed transceiver equipment typically transmits communication signals to and receives communication signals from mobile devices within its cell via station 1206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 230 within its cell. Communication protocols and parameters may vary between different nodes. For example, one node may employ a different modulation scheme and operate at different frequencies than other nodes.

For all mobile devices 230 registered with a specific network, permanent configuration data such as a user profile may be stored in HLR 1212. HLR 1212 may also contain location information for each registered mobile device, and may be queried to determine the current location of a mobile device. MSC 1210 is typically responsible for a group of location areas and stores the data of the mobile devices currently in its area of responsibility in VLR 1214. Further VLR 1214 may also contain information on mobile devices that are visiting other networks. The information in VLR 1214 typically includes part of the permanent mobile device data transmitted from HLR 1212 to VLR 1214 for faster access. By moving additional information from a remote HLR 1212 node to VLR 1214, the amount of traffic between these nodes may be reduced so that voice and data services can be provided with faster response times and at the same time require less use of computing resources.

SGSN 1216 and GGSN 1218 are elements that may be added for GPRS support; namely packet switched data support, within GSM. SGSN 1216 and MSC 1210 have similar responsibilities within wireless network 210 by keeping track of the location of each mobile device 230. SGSN 1216 may also perform security functions and access control for data traffic on network 210. GGSN 1218 typically provides inter-networking connections with external packet switched networks and connects to one or more SGSN's 1216 via an Internet Protocol (IP) backbone network operated within the network 210. During normal operations, a given mobile device 230 may be required to perform a "GPRS Attach" to acquire an IP address and to access data services. This requirement is not generally present in circuit-switched voice channels as Integrated Services Digital Network (ISDN) addresses may be used for routing incoming and outgoing calls. Currently, GPRS capable networks may use private, dynamically assigned IP addresses and thus use a DHCP server 1220 connected to the GGSN 1218. There are many mechanisms for dynamic IP assignment, including using a combination of a Remote Authentication Dial-In User Service (RADIUS) server and DHCP server, for example.

Once the GPRS Attach is complete, a logical connection may be established from a mobile device 230, through PCU 1208, and SGSN 1216 to an Access Point Node (APN) within GGSN 1218. The APN represents a logical end of an IP tunnel that, typically, can either access direct Internet-compatible services or private network connections. The APN may also represent a security mechanism for network 210, insofar as each mobile device 230 may be assigned to one or more APNs, and mobile devices 230 may not be able to exchange data without first performing a GPRS Attach to an APN that it has been authorized to use. The APN may be considered to be similar to an Internet domain name such as "myconnection.wireless.com".

Once the GPRS Attach is complete, a tunnel may be created and traffic exchanged within standard IP packets using any protocol that can be supported in IP packets. This may include tunneling methods such as IP over IP as in the case with some IPSecurity (IPsec) connections used with Virtual Private Networks (VPN). These tunnels are also referred to as Packet Data Protocol (PDP) Contexts and there are a limited number of these typically available in the network 210. To maximize use of the PDP Contexts, network 210 may run an idle timer for each PDP Context to determine if there is a lack of activity. When a mobile device 230 is not using its PDP Context, the PDP Context may be deallocated and the IP address returned to the IP address pool managed by DHCP server 1220.

Some of the acts of one or more methods described herein may be provided as software instructions, stored on computer-readable storage media and executable by a processor. Examples of computer-readable storage media may include a hard disk, a floppy disk, an optical disk (e.g. a compact disk, a digital video disk), a flash drive or flash memory, magnetic tape, and memory. Other configurations are possible as well.

In variant implementations, some of the acts of one or more methods described herein may be provided as executable software instructions stored in transmission media.

It should also be noted that at least some of the elements used to perform at least one embodiment of a method described herein that are implemented via software may be written in a high-level procedural language such as object oriented programming. Accordingly, the program code may be written in C, C++ or any other suitable programming language and may comprise modules or classes, as is known to those skilled in object-oriented programming. Alternatively, in addition thereto, at least some of these elements implemented via software may be written in assembly language, machine language or firmware as needed. In either case, the program code can be stored on a storage media or on a computer-readable medium that is readable by a general or special purpose programmable computing device having a processor, an operating system and the associated hardware and software that is necessary to implement the functionality of at least one embodiment of a method described herein. The program code, when read by a processor, configures the processor to operate in a new, specific and predefined manner in order to perform at least one embodiment of a method described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. Accordingly, what has been described above is intended to be illustrative of the claimed concept and non-limiting. It will be understood by persons skilled in the art that variations are possible in variant implementations and embodiments.

The invention claimed is:

1. A portable bridge device comprising:
   a processor and a memory;
   a short-range communication module configured to establish a first communication channel between the portable bridge device and a first local device, and configured to establish a second communication channel between the portable bridge device and a second local device; and
   at least one platform-specific interface module configured to:

determine a first computing platform of the first local device, the first computing platform running a first operating system;

process first application data, based on the determined first computing platform, to reformat the first application data into first reformatted application data suitable for presentation on the first computing platform;

transmit the first reformatted application data to a first portable bridge device interface module of the first local device via the first communication channel;

determine a second computing platform of the second local device, the second computing platform running a second operating system;

process second application data, based on the determined second computing platform, to reformat the second application data into second reformatted application data suitable for presentation on the second computing platform; and, transmit to a second portable bridge device interface module of the second local device via the second communication channel.

2. The portable bridge device of claim 1, wherein the first computing platform of the first local device and the second computing platform of the second local device are different.

3. The portable bridge device of claim 1, wherein the first reformatted application data is stylistically consistent with the first computing platform of the first local device.

4. The portable bridge device of claim 3, wherein the second reformatted application data is stylistically consistent with the second computing platform of the second local device.

5. The portable bridge device of claim 1, wherein the portable bridge device is sized such that the portable device is easily carried on the body of a user.

6. The portable bridge device of claim 5, wherein the portable bridge device is configured to be at least one of: attachable to a belt, storable in a pocket, and carried in a briefcase or purse.

7. The portable bridge device of claim 1, further comprising:

an application execution module configured to execute at least one application at the portable bridge device to generate the first and second application data.

8. The portable bridge device of claim 7, wherein the at least one platform-specific interface module is further configured to:

receive, from the first portable bridge device interface module via the first communication channel, first input data associated with user input received at the first local device for processing by the application execution module; and receive, from the second portable bridge device interface module via the second communication channel, second input data associated with user input received at the second local device for processing by the application execution module.

9. The portable bridge device of claim 1, further comprising:

a long-range communication module configured to establish a long-range communication channel between the portable bridge device and a remote computing device.

10. The portable bridge device of claim 9, wherein the remote computing device comprises a storage and provisioning portal server.

11. The portable bridge device of claim 9, wherein the portable bridge device is configured to receive the first application data and second application data from the storage and provisioning portal server via the long-range communication channel when at least one application is executed at the storage and provisioning portal server.

12. The portable bridge device of claim 11, wherein the at least one platform-specific interface module comprises a first platform-specific interface module and a second platform-specific interface module, and wherein:

the first platform-specific interface module is further configured to:

receive, from the first portable bridge device interface module via the first communication channel, first input data associated with user input received at the first local device, and transmit the first input data to the remote computing device via the long-range communication channel; and the second platform-specific interface module is further configured to:

receive, from the second portable bridge device interface module via the second communication channel, second input data associated with user input received at the second local device, and transmit the second input data to the remote computing device via the long-range communication channel.

13. A method for transmitting application data from a portable bridge device to a first local device and a second local device, the method comprising:

establishing, via a short-range communication module of the portable bridge, a first communication channel between the portable bridge device and the first local device;

establishing, via the short-range communication module of the portable bridge, a second communication channel between the portable bridge device and the second local device;

determining, utilizing at least one platform-specific interface module of the portable bridge device, a first computing platform of the first local device, the first computing platform running a first operating system;

processing first application data, utilizing the at least one platform-specific interface module of the portable bridge device and based on the determined first computing platform, to reformat the first application data into first reformatted application data suitable for presentation on the first computing platform;

transmitting the reformatted first application data to a first portable bridge device interface module of the first local device via the first communication channel;

determining, utilizing the at least one platform-specific interface module of the portable bridge device, a second computing platform of the second local device, the second computing platform running a second operating system; and processing second application data, utilizing the at least one platform-specific interface module of the portable bridge device and based on the determined second computing platform, to reformat the second application data into second reformatted application data suitable for presentation on the second computing platform; and, transmitting the reformatted second application data to a second portable bridge device interface module of the second local device via the second communication channel.

14. The method of claim 13, wherein the first computing platform of the first local device and the second computing platform of the second local device are different.

15. The method of claim 13, wherein the first reformatted application data is stylistically consistent with the first computing platform of the first local device.

16. The method of claim 15, wherein the second reformatted application data is stylistically consistent with the second computing platform of the second local device.

17. The method of claim 13, further comprising:
executing, using an application execution module, at least one application at the portable bridge device to generate the first and second application data.

18. The method of claim 17, further comprising:
receiving, from the first portable bridge device interface module via the first communication channel, first input data associated with user input received at the first local device for processing by the application execution module.

19. The method of claim 18, further comprising:
receiving, from the second portable bridge device interface module via the second communication channel, second input data associated with user input received at the second local device for processing by the application execution module.

20. The method of claim 13, further comprising:
establishing a long-range communication channel between the portable bridge device and a remote computing device, wherein the remote computing device is configured to execute at least one application at the remote computing device to generate the first and second application data; and
receiving the first and second application data via the long-range communication channel prior to transmission to, respectively, the first and second portable bridge device interface modules of the first and second local devices.

21. The method of claim 20, further comprising:
receiving, from the first portable bridge device interface module via the first communication channel, first input data associated with user input received at the first local device, and
transmitting the first input data to the remote computing device via the long-range communication channel.

22. The method of claim 21, further comprising:
receiving, from the second portable bridge device interface module via the second communication channel, second input data associated with user input received at the second local device, and
transmitting the second input data to the remote computing device via the long-range communication channel.

23. A non-transitory computer-readable medium comprising computer readable instructions executable by a processor of a portable bridge device, to cause the portable bridge device to:
establish, via a short-range communication module of the portable bridge, a first communication channel between the portable bridge device and the first local device;
establish, via the short-range communication module of the portable bridge, a second communication channel between the portable bridge device and the second local device;
determine, utilizing at least one platform-specific interface module of the portable bridge device, a first computing platform of the first local device, the first computing platform running a first operating system;
processing first application data, utilizing the at least one platform-specific interface module of the portable bridge and based on the determined first computing platform, first application data
transmitting the first reformatted application data to a first portable bridge device interface module of the first local device via the first communication channel;
determine, utilizing the at least one platform-specific interface module of the portable bridge device, a second computing platform of the second local device, the second computing platform running a second operating system;
processing second application data, utilizing the at least one platform-specific interface module of the portable bridge and based on the determined second computing platform, to reformat the second application data into second reformatted application data suitable for presentation on the second computing platform; and,
transmitting the second reformatted application data to a second portable bridge device interface module of the second local device via the second communication channel.

* * * * *